United States Patent
Patchava et al.

(10) Patent No.: US 11,777,566 B2
(45) Date of Patent: Oct. 3, 2023

(54) ORTHOGONAL TIME FREQUENCY SPACE PRECODING OF SOUNDING REFERENCE SIGNALS

(71) Applicant: QUALCOMM Incorporated, San Diego, CA (US)

(72) Inventors: Raviteja Patchava, San Diego, CA (US); Jun Ma, San Diego, CA (US); Morteza Soltani, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/649,502

(22) Filed: Jan. 31, 2022

(65) Prior Publication Data

US 2023/0246679 A1    Aug. 3, 2023

(51) Int. Cl.
| | | |
|---|---|---|
| *H04B 7/0456* | (2017.01) | |
| *H04B 7/185* | (2006.01) | |
| *H04W 72/0446* | (2023.01) | |
| *H04L 5/00* | (2006.01) | |

(52) U.S. Cl.
CPC ......... *H04B 7/0478* (2013.01); *H04B 7/1855* (2013.01); *H04L 5/0048* (2013.01); *H04W 72/0446* (2013.01)

(58) Field of Classification Search
CPC ... H04B 7/0478; H04B 7/1855; H04L 5/0048; H04W 72/0446
See application file for complete search history.

(56) References Cited

U.S. PATENT DOCUMENTS

| | | | |
|---|---|---|---|
| 11,184,122 B2* | 11/2021 | Sathyanarayan | ... H04L 27/2636 |
| 2022/0231738 A1* | 7/2022 | Haustein | ............. H04B 7/0408 |
| 2022/0393921 A1* | 12/2022 | Pfadler | .............. H04L 25/0224 |
| 2023/0045308 A1* | 2/2023 | Guan | ...................... H04B 7/04 |

* cited by examiner

*Primary Examiner* — Janice N Tieu
(74) *Attorney, Agent, or Firm* — Harrity & Harrity, LLP

(57) ABSTRACT

Various aspects of the present disclosure generally relate to wireless communication. In some aspects, a user equipment (UE) may precode a sounding reference signal (SRS) transmission using a delay-Doppler precoder. The UE may transmit, after precoding the SRS transmission using the delay-Doppler precoder, the SRS transmission in an SRS symbol in a slot. Numerous other aspects are described.

23 Claims, 17 Drawing Sheets

ORTHOGONAL TIME FREQUENCY SPACE PRECODING OF SOUNDING REFERENCE SIGNALS

FIELD OF THE DISCLOSURE

Aspects of the present disclosure generally relate to wireless communication and to techniques and apparatuses for orthogonal time frequency space (OTFS) precoding of sounding reference signals (SRSs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include precoding a sounding reference signal (SRS) transmission using a delay-Doppler precoder. The method may include transmitting, after precoding the SRS transmission using the delay-Doppler precoder, the SRS transmission in an SRS symbol in a slot.

Some aspects described herein relate to a method of wireless communication performed by a base station. The method may include receiving, from a UE, an SRS transmission in an SRS symbol in a slot. The method may include decoding the SRS transmission using a delay-Doppler decoder.

Some aspects described herein relate to a UE for wireless communication. The UE may include a memory and one or more processors coupled to the memory. The one or more processors may be configured to precode an SRS transmission using a delay-Doppler precoder. The one or more processors may be configured to transmit, after precoding the SRS transmission using the delay-Doppler precoder, the SRS transmission in an SRS symbol in a slot.

Some aspects described herein relate to a base station for wireless communication. The base station may include a memory and one or more processors coupled to the memory. The one or more processors may be configured to receive, from a UE, an SRS transmission in an SRS symbol in a slot. The one or more processors may be configured to decode the SRS transmission using a delay-Doppler decoder.

Some aspects described herein relate to a non-transitory computer-readable medium that stores a set of instructions for wireless communication by a UE. The set of instructions, when executed by one or more processors of the UE, may cause the UE to precode an SRS transmission using a delay-Doppler precoder. The set of instructions, when executed by one or more processors of the UE, may cause the UE to transmit, after precoding the SRS transmission using the delay-Doppler precoder, the SRS transmission in an SRS symbol in a slot.

Some aspects described herein relate to a non-transitory computer-readable medium that stores a set of instructions for wireless communication by a base station. The set of instructions, when executed by one or more processors of the base station, may cause the base station to receive, from a UE, an SRS transmission in an SRS symbol in a slot. The set of instructions, when executed by one or more processors of the base station, may cause the base station to decode the SRS transmission using a delay-Doppler decoder.

Some aspects described herein relate to an apparatus for wireless communication. The apparatus may include means for precoding an SRS transmission using a delay-Doppler precoder. The apparatus may include means for transmitting, after precoding the SRS transmission using the delay-Doppler precoder, the SRS transmission in an SRS symbol in a slot.

Some aspects described herein relate to an apparatus for wireless communication. The apparatus may include means for receiving, from a UE, an SRS transmission in an SRS symbol in a slot. The apparatus may include means for decoding the SRS transmission using a delay-Doppler decoder.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
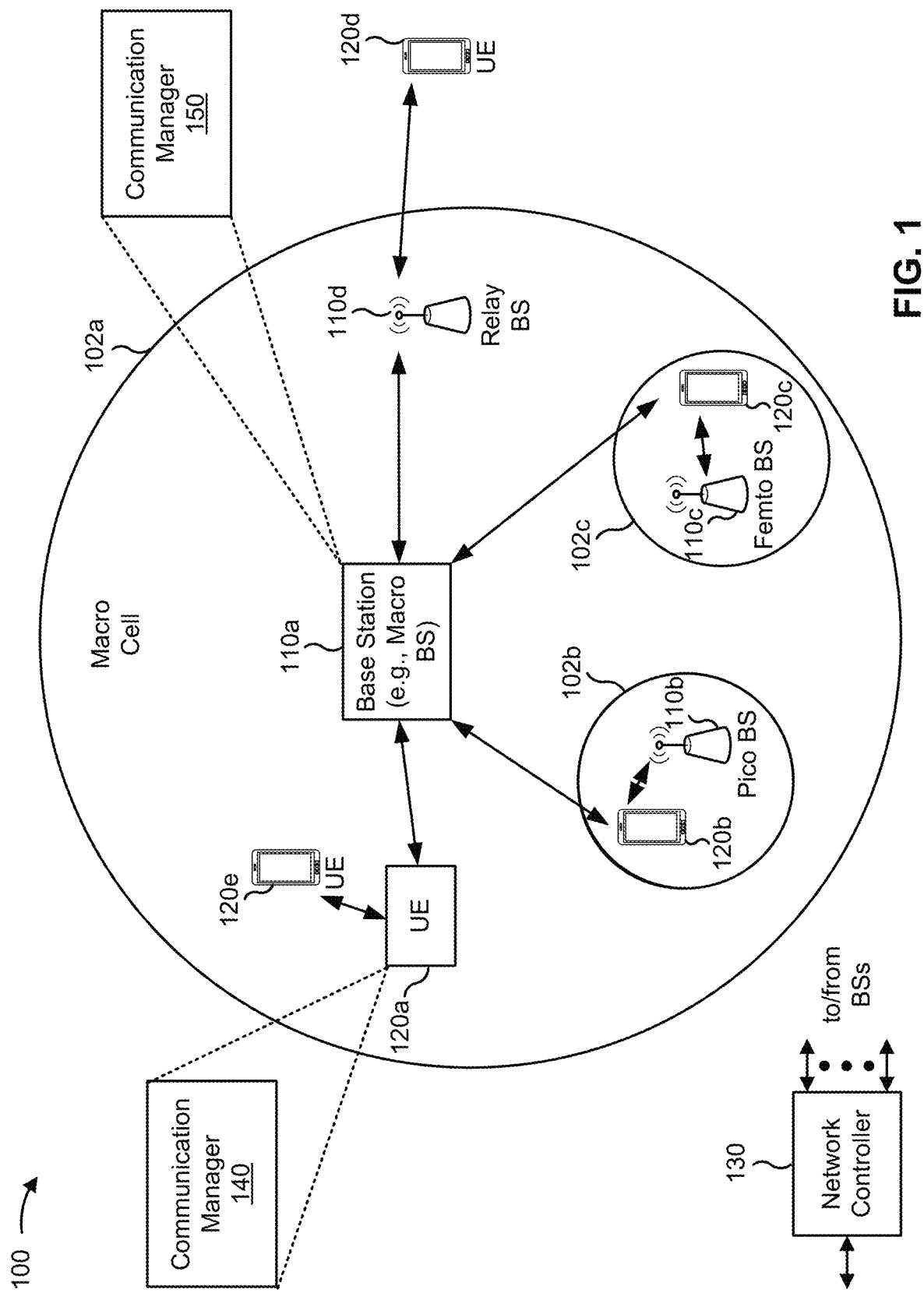
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may precode a sounding reference signal (SRS) transmission using a delay-Doppler precoder; and transmit, after precoding the SRS transmission using the delay-Doppler precoder, the SRS transmission in an SRS symbol in a slot. Additionally, or alternatively, the communication manager 140 may perform one or more other operations described herein.

In some aspects, the base station 110 may include a communication manager 150. As described in more detail elsewhere herein, the communication manager 150 may receive, from a UE 120, an SRS transmission in an SRS symbol in a slot; and decode the SRS transmission using a delay-Doppler decoder. Additionally, or alternatively, the communication manager 150 may perform one or more other operations described herein.

As indicated above, FIG. 1 is provided as an example. Other examples may differ from what is described with regard to FIG. 1.

Figure 2:
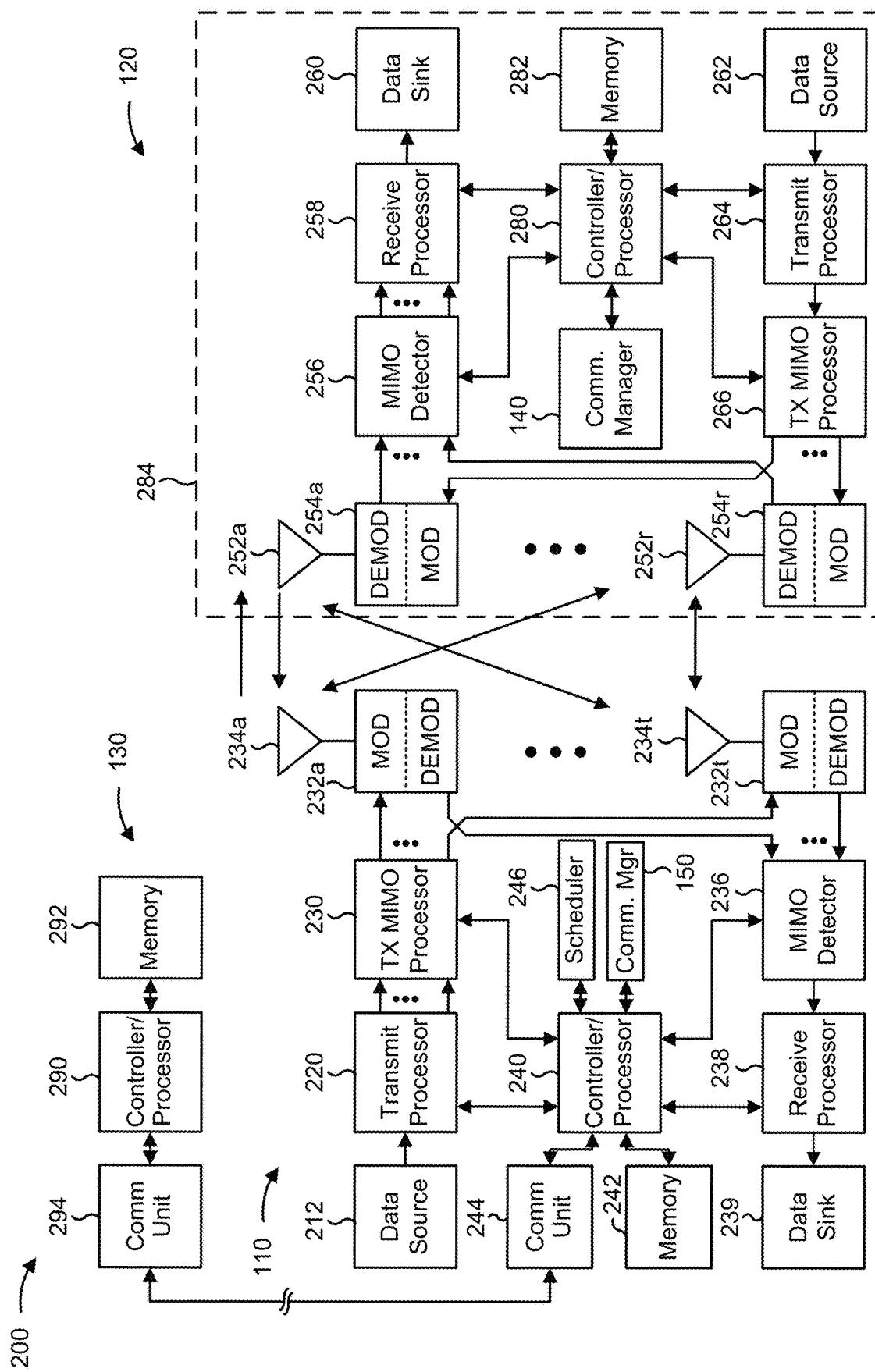
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-16).

The controller/processor 240 of the base station 110, the controller/processor 280 of the UE 120, and/or any other component(s) of FIG. 2 may perform one or more techniques associated with orthogonal time frequency space (OTFS) precoding and decoding of SRS transmissions, as described in more detail elsewhere herein. For example, the controller/processor 240 of the base station 110, the controller/processor 280 of the UE 120, and/or any other component(s) of FIG. 2 may perform or direct operations of, for example, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, the UE 120 includes means for precoding an SRS transmission using a delay-Doppler precoder; and/or means for transmitting, after precoding the SRS transmission using the delay-Doppler precoder, the SRS transmission in an SRS symbol in a slot. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving, from a UE 120, an SRS transmission in an SRS symbol in a slot; and/or means for decoding the SRS transmission using a delay-Doppler decoder. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
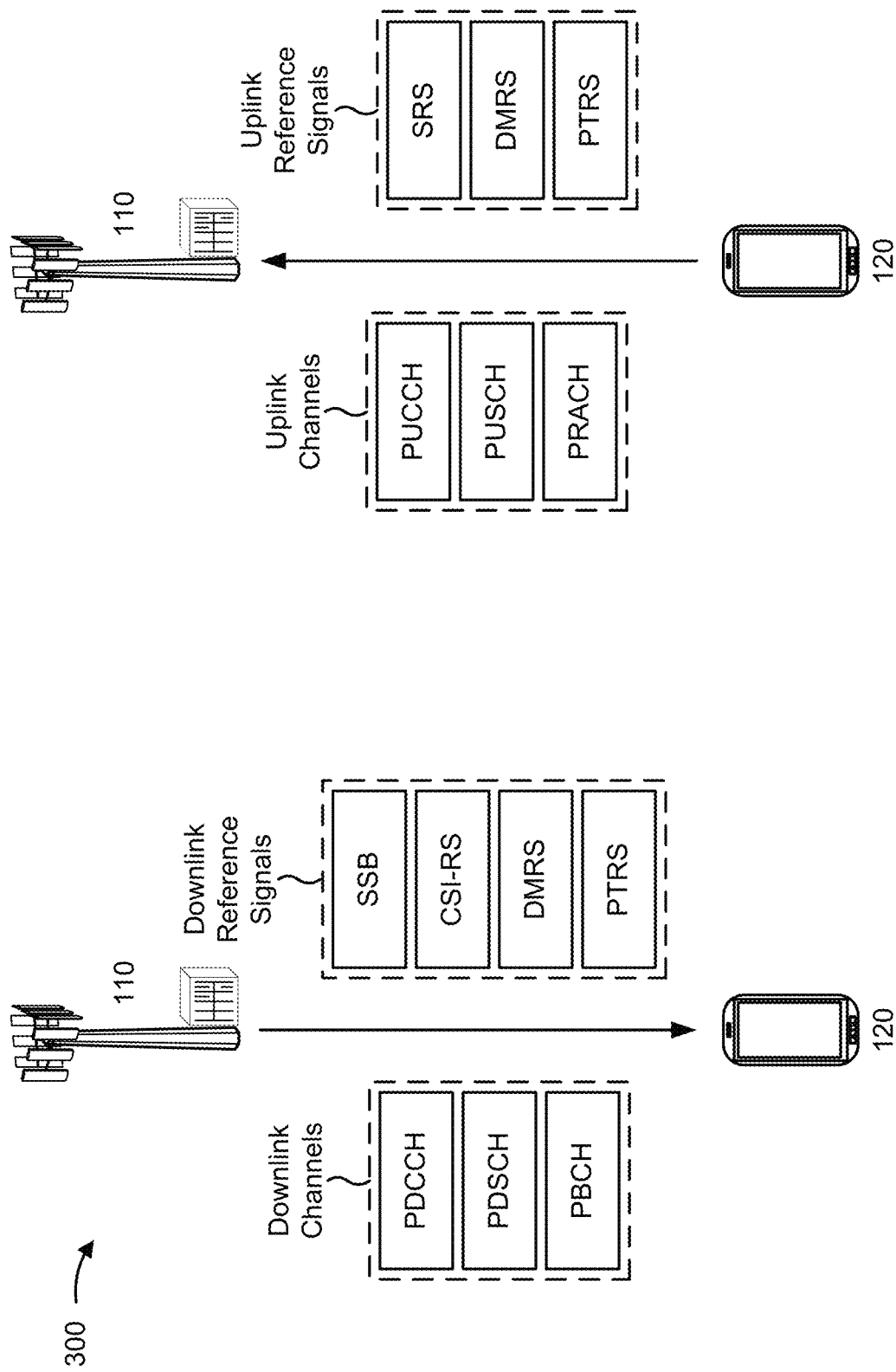
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
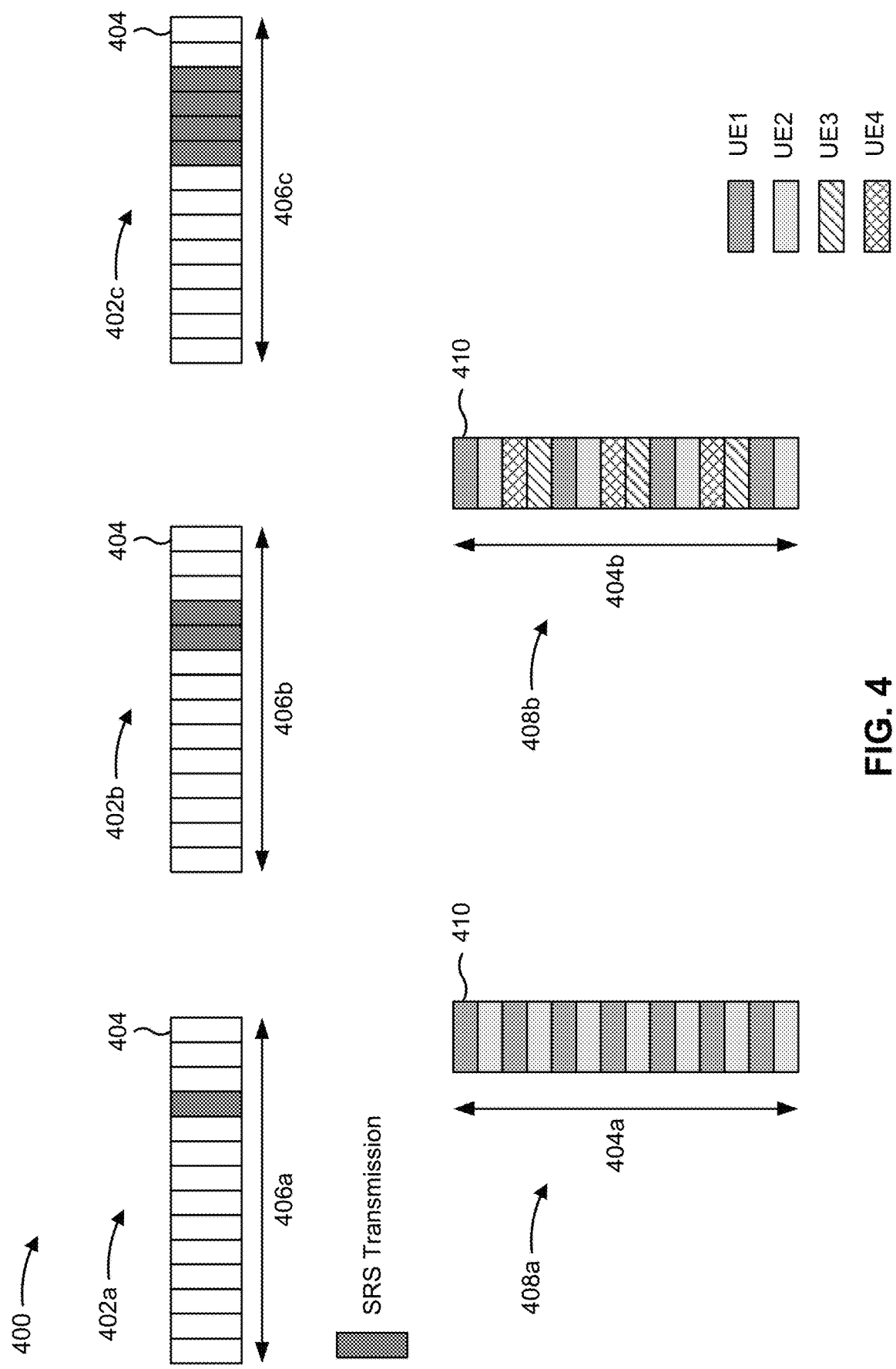
FIG. 4 is a diagram illustrating an example of orthogonal frequency division multiplexing for sounding reference signal (SRS) transmission.

FIG. 4 is a diagram illustrating an example 400 of orthogonal frequency division multiplexing (OFDM) for SRS transmission. A UE may transmit an SRS using an OFDM waveform, in which the SRS is transmitted in one or more time domain resources and in one or more frequency domain resources. In some cases, a UE may transmit an SRS in one or more symbols in the time domain, such as one symbol, two symbols, and/or four symbols, among other examples. Moreover, a UE may transmit an SRS using a frequency comb structure in the frequency domain.

As shown in an example time domain configuration 402*a*, a UE may transmit an SRS in a single symbol 404 in a slot 406*a*. As shown in an example time domain configuration 402*b*, a UE may transmit an SRS in two symbols 404 in a slot 406*b*. As shown in an example time domain configuration 402*c*, a UE may transmit an SRS in four symbols 404 in a slot 406*c*. Other quantities of symbols for SRS transmission in a slot are within the scope of the present disclosure. Moreover, the symbols in which an SRS transmission is performed may be contiguous and/or consecutive, or non-contiguous and/or non-consecutive.

As shown in an example frequency domain configuration 408*a*, a plurality of UEs (e.g., UE1 and UE2) may transmit SRSs in a symbol 404*a*. In particular, the UEs may transmit SRSs in a comb-2 structure in which the UE1 and the UE2 use different resource blocks 410 in the symbol 404*a*. The UE1 transmits a first SRS in a first subset of resource blocks 410 in the symbol 404*a*, and the UE2 transmits a second SRS in a second subset of resource blocks 410 in the symbol 404a. The first subset and the second subset may be configured in an alternating manner, as shown in the example frequency domain configuration 408a.

As shown in an example frequency domain configuration 408b, a plurality of UEs (e.g., UE1, UE2, UE3, and UE4) may transmit SRSs in a symbol 404b. In particular, the UEs may transmit SRSs in a comb-4 structure in which the UE1 and the UE2 use different resource blocks 410 in the symbol 404b. The UE1 transmits a first SRS in a first subset of resource blocks 410 in the symbol 404b, the UE2 transmits a second SRS in a second subset of resource blocks 410 in the symbol 404b, the UE3 transmits a second SRS in a second subset of resource blocks 410 in the symbol 404c, and the UE4 transmits a second SRS in a second subset of resource blocks 410 in the symbol 404d. The first subset, the second subset, the third subset, and the fourth subset may be configured in an alternating manner, as shown in the example frequency domain configuration 408b. Other alternating arrangements of the subsets of resource blocks 410 are within the scope of the present disclosure. Moreover, other comb structures and/or frequency domain configurations are within the scope of the present disclosure.

As indicated above, FIG. 4 is provided as an example. Other examples may differ from what is described with regard to FIG. 4.

In some cases, OFDM modulation and demodulation of wireless communications may be susceptible to high residual frequency offset and/or large Doppler spread. These issues can occur, for example, in high-Doppler environments such as V2X communications, high-speed vehicle communications, high-speed train or rail communications, and/or other high-mobility communication environments in which channel conditions in a wireless network rapidly change. Frequency offset and/or large Doppler spread may result in inter-carrier interference (ICI) (e.g., power leakage among sub-carriers) for uplink communications (such as SRS transmissions) in which OFDM modulation and demodulation are used. A wireless channel may function as a linear time-variant channel in a high-mobility sidelink communication environment, as opposed to a linear time-invariant channel that is assumed for OFDM modulation and demodulation. As a result, frequency dispersion and/or time dispersion in a high-mobility communication environment, resulting from high residual frequency offset and/or large Doppler spread, can result in a breakdown in orthogonality in OFDM modulation and demodulation, which causes increased ICI. Increased ICI may result in decreased channel estimation accuracy based at least in part on SRS transmissions, which may cause a decrease in robustness of communications, an increase in dropped or undecodable communications, and/or an increase in retransmissions, among other examples. An increase in retransmissions may result in increased consumption of processing, memory, and/or radio resources for UEs and/or base stations.

Some aspects described herein include OTFS precoding and decoding of wireless communications for mitigating and/or reducing the effects of high residual frequency offset and/or large Doppler shift that can occur in high-mobility sidelink communication environments. As described herein, a UE (e.g., UEs 120) may use OTFS precoding to precode an SRS transmission in a delay-Doppler domain. In particular, a transmitter UE may precode the symbols of the SRS transmission by transforming the symbols from the delay-Doppler domain to the time-frequency domain. The UE may modulate the symbols using OFDM to further transform the symbols from the time-frequency domain to the time domain for transmission over a wireless sidelink channel. A base station may receive the symbols and may perform reverse operations to demodulate and decode the SRS transmission.

OTFS precoding and decoding of SRS transmissions may provide constant fading and multi-path diversity, as well as sparse and stable channel occupation, which enables joint time-frequency diversity for the SRS transmissions. OTFS precoding and decoding may also enable reduced peak-to-average-power ratios (PAPRs), greater power transmission efficiency, and/or reduced cyclic prefix overhead, among other examples. This may decrease ICI for SRS transmissions and may increase the accuracy of channel estimation based at least in part on the SRS transmissions. In this way, robustness of communications may be increased, dropped or undecodable communications may be decreased, and/or retransmissions may be decreased, among other examples.

Figure 5A:
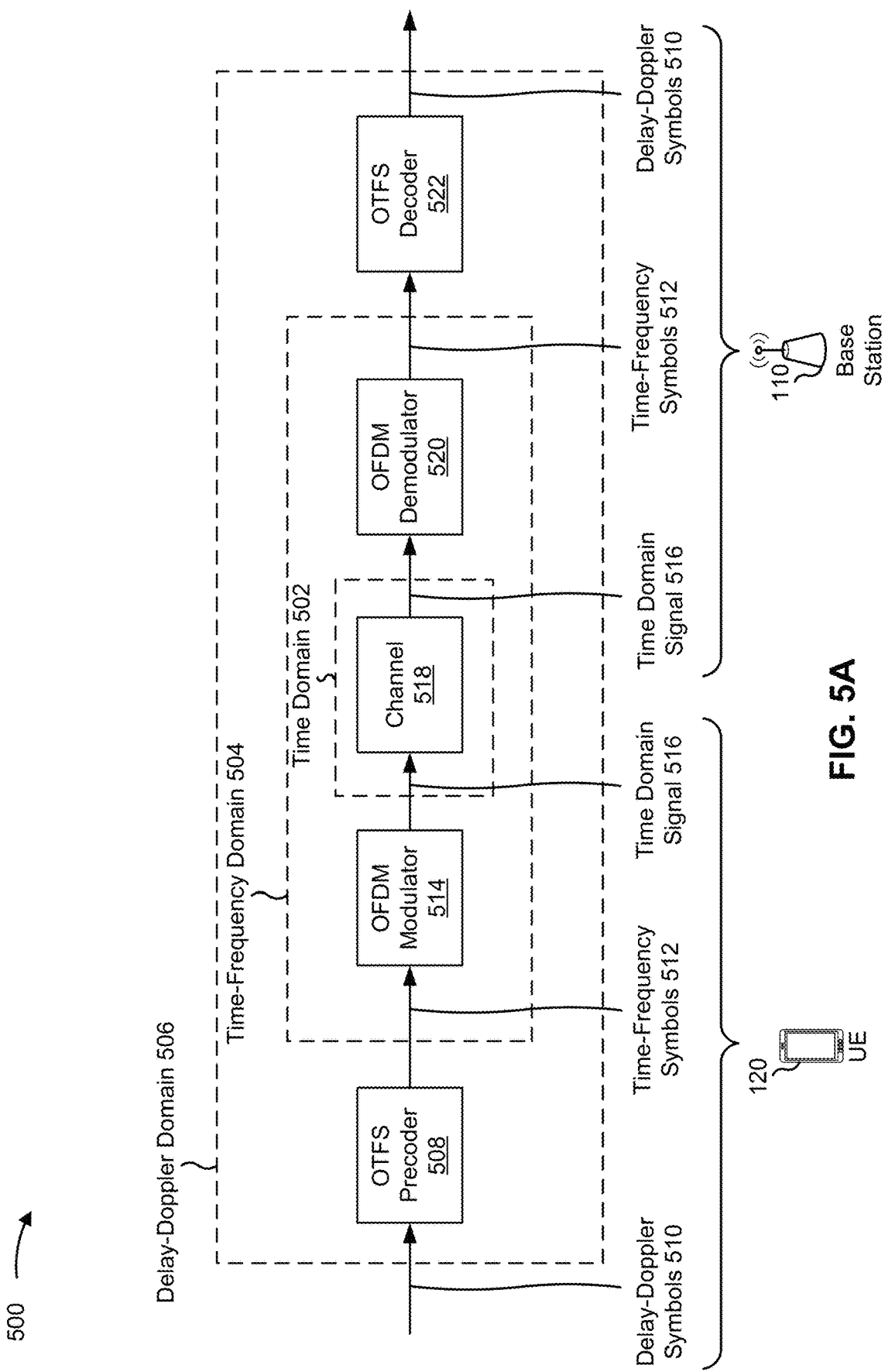
FIGS. 5A and 5B are diagrams illustrating examples associated with orthogonal time frequency space (OTFS) based communication, in accordance with the present disclosure.
Figure 5B:
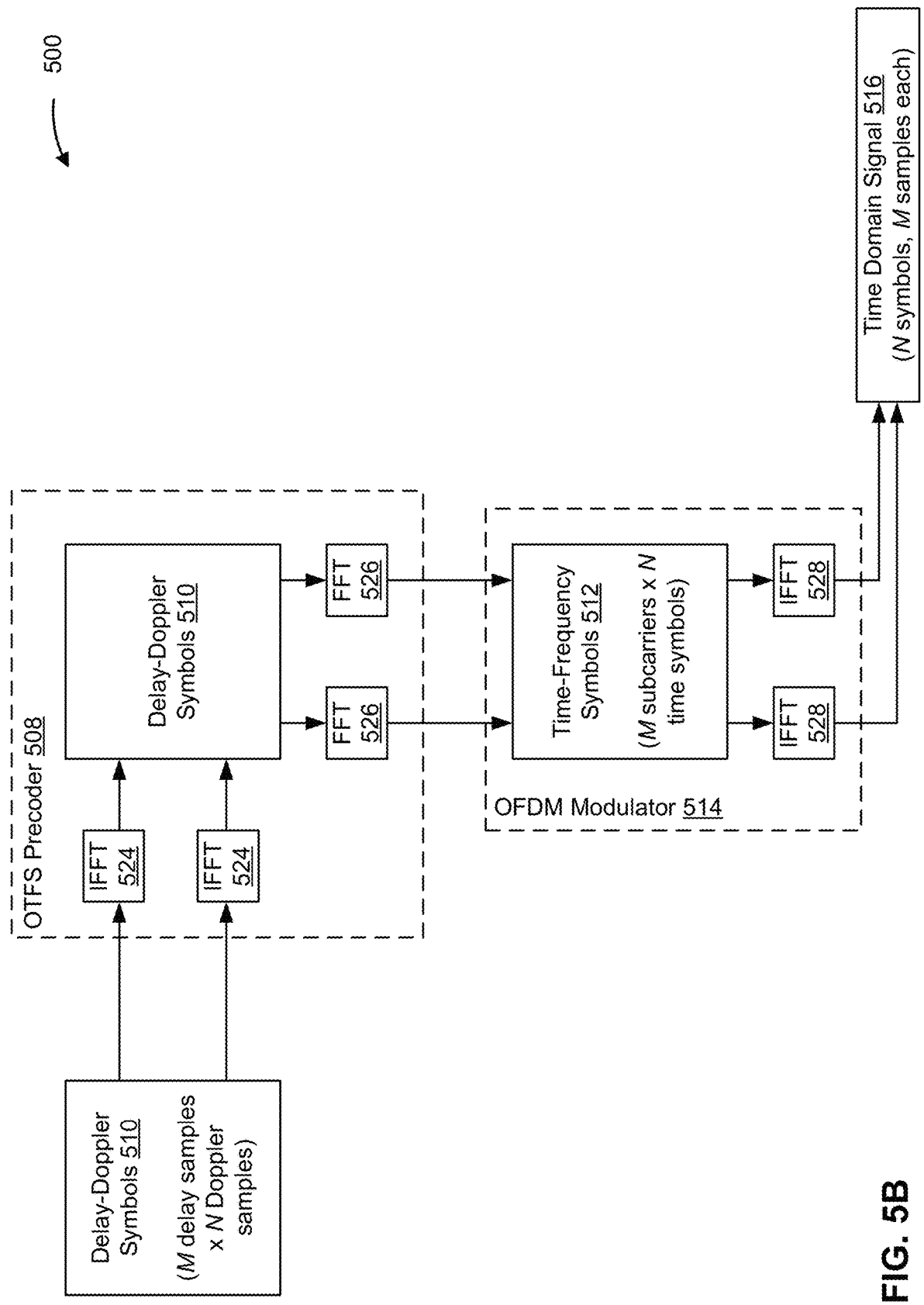

FIGS. 5A and 5B are diagrams of an example 500 of OTFS-based communication, in accordance with the present disclosure. The example 500 includes an example of uplink communication between a UE 120 and a base station 110.

As shown in FIG. 5A, communication between the UE 120 and the base station 110 may be performed in the time domain 502. An uplink communication that is to be transmitted by the UE 120 to the base station 110 may be converted or transformed to the time domain 502 from one or more other domains, such as a time-frequency domain 504 and a delay-Doppler domain 506. The uplink communication may include an SRS transmission, a physical uplink control channel (PUCCH) communication, a physical uplink shared channel (PUSCH) communication, or another type of uplink communication.

As further shown in FIG. 5A, the UE 120 may include an OTFS precoder 508, the OTFS precoder 508 receives a plurality of delay-Doppler symbols 510 of the uplink communication and converts the delay-Doppler symbols 510 from the delay-Doppler domain 506 to the time-frequency domain 504. In particular, the OTFS precoder 508 converts or transforms the delay-Doppler symbols 510 to time-frequency symbols 512. The delay-Doppler symbols 510 include a block of M×N delay-Doppler quadrature amplitude modulated (QAM) symbols that are discretized to an M by N delay-Doppler plane that includes M delay samples and N Doppler shift samples. The time-frequency symbols 512 include a block of M×N OFDM modulated symbols that are spread across M subcarriers and N time symbols.

As further shown in FIG. 5A, the UE 120 may include an OFDM modulator 514. The OFDM modulator 514 converts or transforms the time-frequency symbols 512 from the time-frequency domain 504 to the time domain 502. In particular, the OFDM modulator 514 modulates the time-frequency symbols 512 using an OFDM technique to generate a time domain signal 516 that includes the information of the uplink communication. The time domain signal 516 includes a time-varying signal that includes N symbols, each including M samples. The UE 120 transmits the time domain signal 516 over a channel 518 (e.g., a wireless uplink channel such as a PUCCH or a PUSCH, among other examples) as the uplink communication.

The base station 110 receives the time domain signal 516 over the channel 518 from the UE 120. The base station 110 may include an OFDM demodulator 520 that converts or transforms the time domain signal 516 from the time domain 502 to the time-frequency domain 504. In particular, the OFDM demodulator 520 demodulates the time domain signal 516 using an OFDM technique to convert or transform the time domain signal 516 to the time-frequency symbols 512. The base station 110 further includes an OTFS decoder 522. The OTFS decoder 522 may convert or transform the time-frequency symbols 512 from the time-frequency domain 504 to the delay-Doppler domain 506. In particular, the OTFS decoder 522 may decode the time-frequency symbols 512 to obtain the delay-Doppler symbols 510.

As shown in FIG. 5B, the OTFS precoder 508 may apply or use a two-dimensional finite Fourier transform (FFT), referred to as an inverse symplectic FFT (ISFFT), to convert the delay-Doppler symbols 510 to the time-frequency symbols 512. However, other two-dimensional transforms may be used for OTFS precoding to transform or convert the delay-Doppler symbols 510 to the time-frequency symbols 512.

An ISFFT is a two-dimensional transform that includes an inverse FFT (IFFT) 524 and an FFT 526, where the IFFT 524 is applied in one dimension of a delay-Doppler matrix and the FFT 526 is applied in a second dimension of the delay-Doppler matrix. The OTFS precoder 508 uses the IFFT 524 on the M delay samples of the delay-Doppler symbols 510 and uses the FFT 526 on the N Doppler samples of the delay-Doppler symbols 510 to generate the time-frequency symbols 512. The time-frequency symbols 512 are provided to the OFDM modulator 514. The OFDM modulator 514 includes an IFFT 528 that is used to modulate the time-frequency symbols 512 to generate the time domain signal 516. Note that while the example in FIG. 5B illustrates the M delay samples of the delay-Doppler symbols 510 are mapped first and the N Doppler samples of the delay-Doppler symbols 510 are mapped second, the N Doppler samples of the delay-Doppler symbols 510 may be mapped first and the M delay samples of the delay-Doppler symbols 510 may be mapped second. The order has little to no effect on the precoding performance due to the joint detection in OTFS and constant delay-Doppler channel throughout OTFS. The mapping order can be configured at the base station 110, can be defined in a wireless communication standard or specification (e.g., a 3GPP specification), and/or negotiated among the UE 120 and the base station 110, among other examples.

The OFDM demodulator 520 and the OTFS decoder 522 of the base station 110 may perform reverse operations of those shown in FIG. 5B to demodulate and decode the uplink communication. However, the OTFS decoder 522 uses a symplectic FFT (SFFT) (instead of an ISFFT) to convert the time-frequency symbols 512 to the delay-Doppler symbols 510. The SFFT includes a two-dimensional transform similar to the ISFFT, but a non-inverse version. In some aspects, the OTFS decoder 522 uses another type of two-dimensional transform to convert the time-frequency symbols 512 to the delay-Doppler symbols 510.

As indicated above, FIGS. 5A and 5B are provided as examples. Other examples may differ from what is described with respect to FIGS. 5A and 5B.

Figure 6:
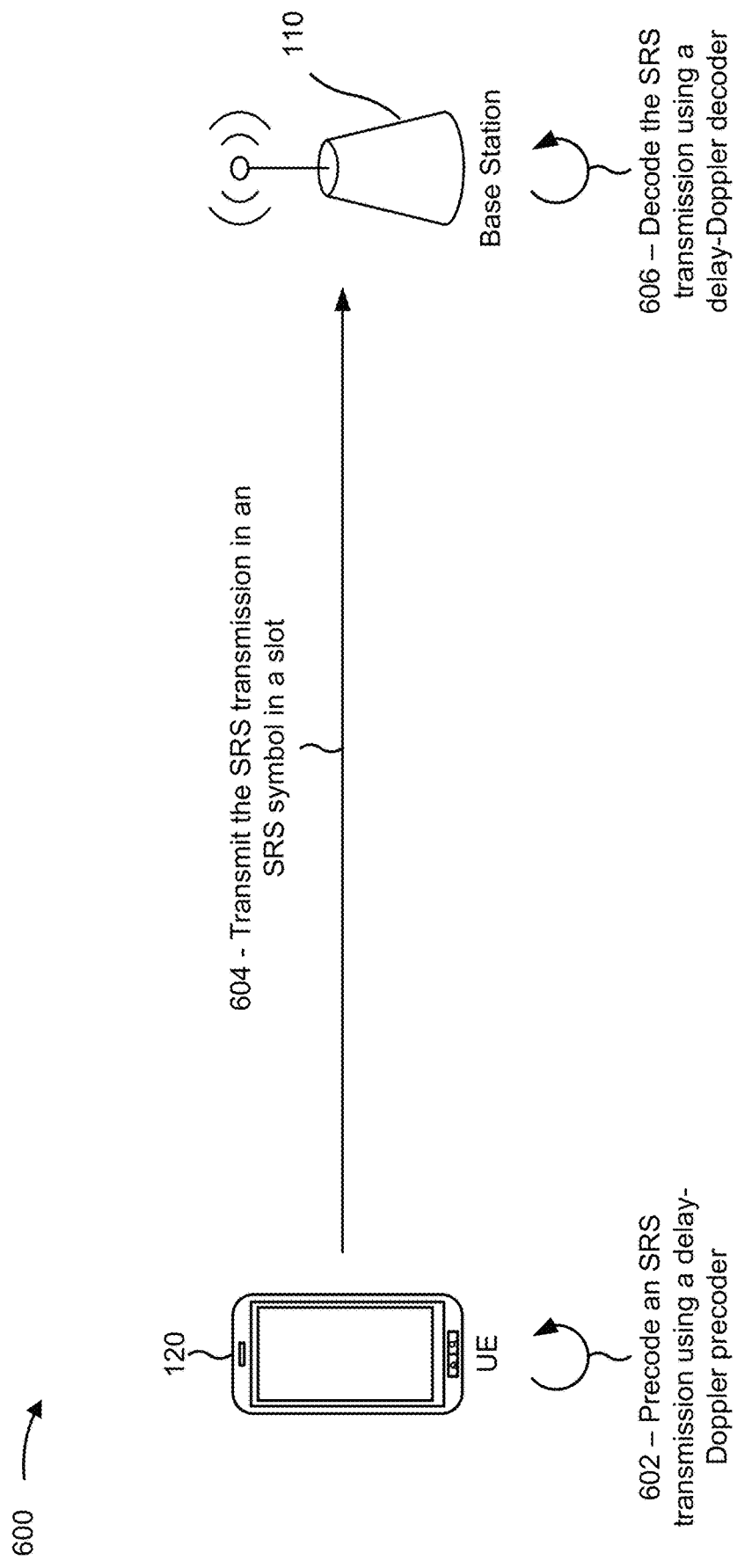
FIGS. 6-12 are diagrams illustrating examples of OTFS precoding and decoding of SRS transmissions, in accordance with the present disclosure.

FIG. 6 is a diagram illustrating an example 600 of OTFS precoding and decoding of SRS transmissions, in accordance with the present disclosure. In particular, the example 600 includes an example of OTFS precoding and decoding of an SRS transmission between a UE 120 and a base station 110.

The UE 120 may be scheduled or configured to transmit an SRS transmission to a base station 110. The UE 120 may be scheduled or configured to transmit the SRS transmission in a slot, such as a slot 406a, a slot 406b, a slot 406c, or another slot having a different SRS configuration.

At 602, the UE 120 may precode the SRS transmission using a delay-Doppler precoder. The SRS transmission may be for transmission to the base station 110 (e.g., for channel estimation). The delay-Doppler precoder may include an ISFFT or another type of two-dimensional transform. The UE 120 may precode the SRS transmission using the delay-Doppler precoder to convert or transform delay-Doppler symbols 510 of the SRS transmission from the delay-Doppler domain 506 to the time-frequency domain 504. In other words, the OTFS precoder 508 of the UE 120 may convert or transform delay-Doppler symbols 510 of the SRS transmission to time-frequency symbols 512.

As further shown in FIG. 6, and by reference number 604, the UE 120 may transmit (and the base station 110 may receive) the SRS transmission (e.g., over the channel 518) after the UE 120 precodes the SRS transmission. In some aspects, the UE 120 (e.g., using the OFDM modulator 514) modulates the time-frequency symbols 512 of the SRS transmission and the time-frequency symbols 512 of the SRS transmission to generate a time domain signal 516 for the SRS transmission. The UE 120 transmits the time domain signal 516 to the UE 120 to transmit the SRS transmission to the base station 110. Due to the placing of the SRS transmission in the delay-Doppler domain, the UE 120's SRS transmission (and other UE SRS transmissions in the slot or symbol) occupies the entire time-frequency plane, which enables increased channel accuracy estimation at the base station 110. Time variations over the channel 518 can be easily tracked by the base station 110 as OTFS precoding may be less susceptible to ICI.

As further shown in FIG. 6, and by reference number 606, the base station 110 may decode the SRS transmission using a delay-Doppler decoder. The base station 110 may decode the SRS transmission using the delay-Doppler decoder (e.g., an SFFT) to convert or transform the time-frequency symbols 512 of the SRS transmission from the time-frequency domain 504 to the delay-Doppler domain 506. In other words, the OTFS decoder 522 of the base station 110 may convert or transform the time-frequency symbols 512 of the SRS transmission to delay-Doppler symbols 510.

As indicated above, FIG. 6 is provided as an example. Other examples may differ from what is described with regard to FIG. 6.

Figure 7:
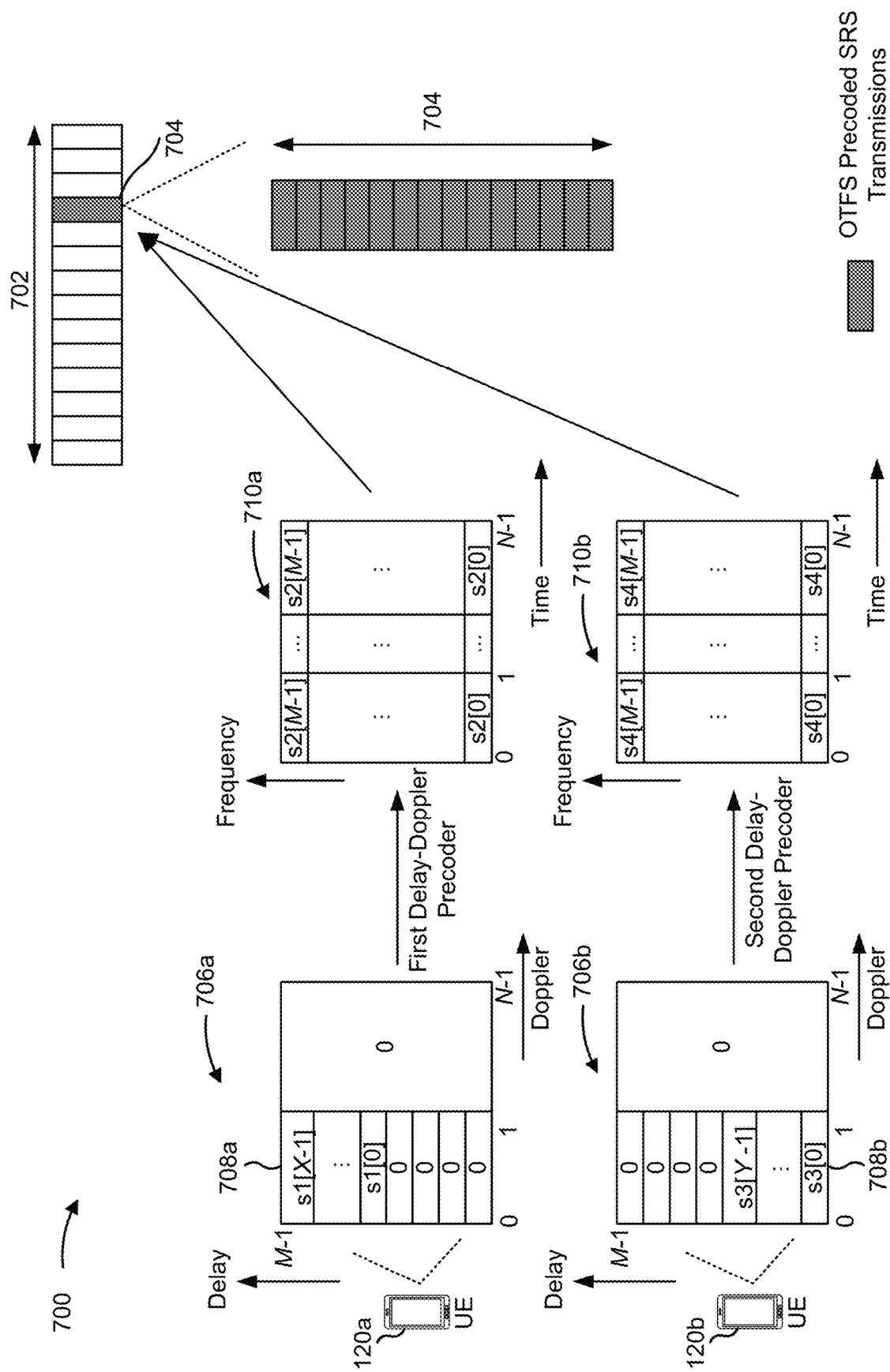

FIG. 7 is a diagram illustrating an example 700 of OTFS precoding and decoding of SRS transmissions, in accordance with the present disclosure. In particular, the example 700 includes an example of OTFS precoding and decoding of a plurality of SRS transmissions by a UE 120a and a UE 120b to a base station 110.

The UE 120a and the UE 120b may each be scheduled or configured to transmit an SRS transmission to a base station 110. The UE 120a and the UE 120b may be scheduled or configured to transmit an SRS transmission in a slot 702 in which a symbol 704 includes an SRS resource for the SRS transmission. Thus, the symbol 704 may be referred to as an SRS symbol. The UE 120a and the UE 120e may perform operations described above in connection with FIGS. 5A, 5B, and/or 6 to precode the SRS transmissions using delay-Doppler precoders such as ISFFTs.

As shown in FIG. 7, the UE 120a may generate a first delay-Doppler matrix 706a (e.g., an ISFFT matrix) for a first SRS transmission that is to be performed by the UE 120a. The UE 120b may generate a second delay-Doppler matrix 706b (e.g., an ISFFT matrix) for a second SRS transmission that is to be performed by the UE 120b. The first delay-Doppler matrix 706a and the second delay-Doppler matrix 706b may each include a plurality of columns and a plurality of rows. The columns may correspond to 0 through M-1 delay resources and the rows may correspond to 0 through N-1 Doppler resources. Here, M corresponds to the total quantity of frequency resources allocated for SRS in the slot 702 and N corresponds to the total quantity of slots 702 allocated for SRS. The value for N may be determined based at least in part on periodic or semi-persistent scheduling, among other examples.

In the Doppler domain, the UE 120a maps the first SRS transmission to a first Doppler resource column (e.g., Doppler resource 1) of the first delay-Doppler matrix 706a, and the UE 120a assigns or uses 0 (zero) values in the remaining 2 through N-1 Doppler resource columns. The purpose of using 0 values for the remaining Doppler resource columns is that, after precoding the first delay-Doppler matrix 706a, the pattern of the first SRS transmission in the first Doppler column will be repeated across the time domain such that the first SRS transmission occupies the full spectrum of frequency domain resources and time domain resources allocated for SRS in the symbol 704. In the delay domain, the UE 120a maps the first SRS transmission to a first subset 708a of delay resources (e.g., s1[0] to s1[X-1] resources, where X corresponds to the quantity of delay resources allocated to the UE 120b) in the first Doppler resource column of the first delay-Doppler matrix 706a. The value for X may be selected based at least in part on the delay spread for the UE 120a. For example, the value for X may be selected (e.g., by the UE 120a, by the base station 110) such that X is greater than or equal to the maximum delay tap of the uplink channel on which the UE 120a is to transmit the first SRS transmission.

In the Doppler domain, the UE 120b maps the second SRS transmission to a first Doppler resource column (e.g., Doppler resource 1) of the second delay-Doppler matrix 706b, and the UE 120b assigns or uses 0 values to the remaining 2 through N-1 Doppler resource columns. In the delay domain, the UE 120b maps the second SRS transmission to a second subset 708b of delay resources (e.g., s3[0] to s3[Y-1] resources, where Y corresponds to the quantity of delay resources allocated to the UE 120b) of the second delay-Doppler matrix 706b. The value for Y may be selected based at least in part on the delay spread for the UE 120b. For example, the value for Y may be selected (e.g., by the UE 120b, by the base station 110) such that Y is greater than or equal to the maximum delay tap of the uplink channel on which the UE 120b is to transmit the second SRS transmission.

As shown in FIG. 7, the UE 120a precodes the first SRS transmission (e.g., after mapping the first SRS transmission to the first delay-Doppler matrix 706a) using a first delay-Doppler precoder (e.g., a first ISFFT precoder) and the UE 120b precodes the second SRS transmission (e.g., after mapping the second SRS transmission to the second delay-Doppler matrix 706b) using a second delay-Doppler precoder (e.g., a second ISFFT precoder). The first delay-Doppler precoder and the second delay-Doppler precoder may be different delay-Doppler precoders.

As further shown in FIG. 7, the first SRS transmission may occupy or may be mapped to a different subset of delay resources relative to the second SRS transmission or vice-versa. For example, the first SRS transmission may occupy or may be mapped to s1[X] resources of the M delay resources, whereas the second SRS transmission may occupy or may be mapped to s3[Y] resources of the M delay resources. The resources to which the first SRS transmission may be mapped and the resources to which the second SRS transmission may be mapped may be non-overlapping (e.g., may be orthogonal) in the delay domain.

The UE 120a precodes the first SRS transmission using the first delay-Doppler precoder to transform the first delay-Doppler matrix 706a to a first time-frequency matrix 710a. The UE 120a may transform (e.g., using an OFDM modulator 514) the first delay-Doppler matrix 706a to a first time-frequency matrix 710a using one or more techniques described above in connection with FIGS. 5A and/or 5B. For example, the UE 120a may transform (e.g., using a first ISFFT) the delay-Doppler symbols of the first SRS transmission mapped to the first time-frequency matrix 710a to generate a plurality of time-frequency symbols. The plurality of time-frequency symbols occupy the N time domain resources and the M frequency domain resources of the first time-frequency matrix 710a (e.g., s2[0] through s2[M-1]).

The UE 120a may then transform the plurality of time-frequency symbols from the time-frequency domain to the time domain to generate a time domain signal for the first SRS transmission. The UE 120a may transmit the time domain signal of the first SRS transmission to the base station 110 in the symbol 704.

The UE 120b precodes the second SRS transmission using the second delay-Doppler precoder to transform the second delay-Doppler matrix 706b to a second time-frequency matrix 710b. The UE 120b may transform (e.g., using an OFDM modulator 514) the second delay-Doppler matrix 706b to a second time-frequency matrix 710b using one or more techniques described above in connection with FIGS. 5A and/or 5B. For example, the UE 120b may transform (e.g., using a second ISFFT) the delay-Doppler symbols of the second SRS transmission mapped to the second time-frequency matrix 710b to generate a plurality of time-frequency symbols. The plurality of time-frequency symbols occupy the N time domain resources and the M frequency domain resources of the second time-frequency matrix 710b (e.g., s4[0] through s4[M-1]).

The UE 120b may then transform the plurality of time-frequency symbols from the time-frequency domain to the time domain to generate a time domain signal for the second SRS transmission. The UE 120b may transmit the time domain signal of the second SRS transmission to the base station 110 in the symbol 704.

The base station 110 may receive the time domain signal of the first SRS transmission and the time domain signal of the second SRS transmission in the symbol 704. The base station 110 may decode the first SRS transmission using a first delay-Doppler decoder (e.g., a first SFFT) and may decode the second SRS transmission using a second delay-Doppler decoder (e.g., a second SFFT). The base station 110 may decode the first SRS transmission and the second SRS transmission using one or more techniques described above in connection with FIGS. 5A and/or 5B. For example, the base station 110 may transform the time domain signal of the first SRS transmission to a plurality of time-frequency domain symbols using an OFDM demodulator 520, and may transform the plurality of time-frequency domain symbols to a plurality of delay-Doppler samples using an OTFS decoder 522 (e.g., a first OTFS decoder 522). The base station 110 may transform the time domain signal of the second SRS transmission to a plurality of time-frequency domain symbols using an OFDM demodulator 520, and may transform the plurality of time-frequency domain symbols to a plurality of delay-Doppler samples using an OTFS decoder 522 (e.g., a second OTFS decoder 522).

As indicated above, FIG. 7 is provided as an example. Other examples may differ from what is described with regard to FIG. 7.

Figure 8:
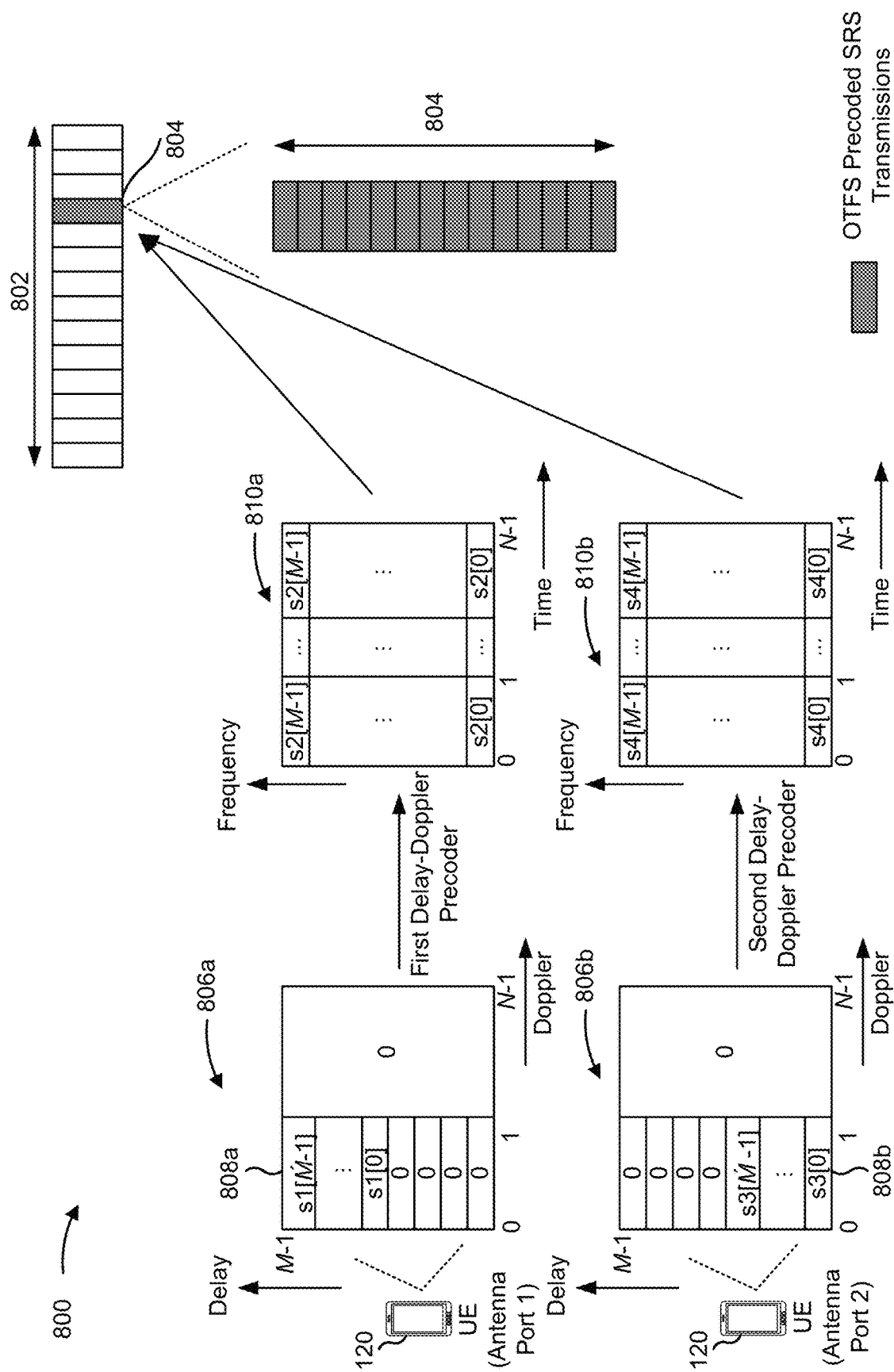

FIG. 8 is a diagram illustrating an example 800 of OTFS precoding and decoding of SRS transmissions, in accordance with the present disclosure. In particular, the example 800 includes an example of OTFS precoding and decoding of a plurality of SRS transmissions by a UE 120 to a base station 110. In particular, the UE 120 transmits a first SRS transmission and a second SRS transmission to the base station 110 in an SRS symbol in a slot 802 (e.g., in a symbol 804 included in the slot 802). The example 800 is similar to the example 700 of FIG. 7, except that the UE 120 uses respective (different) antenna ports to transmit the first SRS transmission and the second SRS transmission to the base station 110, as opposed to different UEs transmitting the first SRS transmission and the second SRS transmission. Accordingly, the UE 120 may use the techniques described above in FIG. 7 to precode the first SRS transmission and the second SRS transmission using different delay-Doppler precoders (e.g., different ISFFT precoders).

As shown in FIG. 8, the UE 120 precodes the first SRS transmission (e.g., after mapping the first SRS transmission to a first delay-Doppler matrix 806a) using a first delay-Doppler precoder (e.g., a first ISFFT precoder) and the UE 120 precodes the second SRS transmission (e.g., after mapping the second SRS transmission to the delay-Doppler matrix 806b) using a second delay-Doppler precoder (e.g., a second ISFFT precoder). The first delay-Doppler precoder and the second delay-Doppler precoder may be different delay-Doppler precoders.

The UE 120 maps the first SRS transmission to a first Doppler resource column (e.g., Doppler resource 1) of the first delay-Doppler matrix 806a, and the UE 120 assigns or uses 0 values in the remaining 2 through N-1 Doppler resource columns. The UE 120 maps the first SRS transmission to a first subset 808a of delay resources (e.g., s1[0] to s1[X-1] resources, where X corresponds to the quantity of delay resources allocated to the UE 120 for the first SRS transmission) in the first Doppler resource column of the first delay-Doppler matrix 806a.

The UE 120 maps the second SRS transmission to a second Doppler resource column (e.g., Doppler resource 1) of the second delay-Doppler matrix 806b, and the UE 120 assigns or uses 0 values in the remaining 2 through N-1 Doppler resource columns. The UE 120 maps the second SRS transmission to a second subset 808b of delay resources (e.g., s3[0] to s3[Y-1] resources, where Y corresponds to the quantity of delay resources allocated to the UE 120 for the second SRS transmission) in the first Doppler resource column of the second delay-Doppler matrix 806b.

As further shown in FIG. 8, the first SRS transmission may occupy or may be mapped to a different subset of delay resources relative to the second SRS transmission or vice-versa. For example, the first SRS transmission may occupy or may be mapped to s1[X] resources of the M delay resources, whereas the second SRS transmission may occupy or may be mapped to s3[Y] resources of the M delay resources. The resources to which the first SRS transmission may be mapped and the resources to which the second SRS transmission may be mapped may be non-overlapping (e.g., may be orthogonal) in the delay domain.

The UE 120 precodes the first SRS transmission using the first delay-Doppler precoder to transform the first delay-Doppler matrix 806a to a first time-frequency matrix 810a. The UE 120 may transform (e.g., using an OFDM modulator 514) the first delay-Doppler matrix 806a to a first time-frequency matrix 810a using one or more techniques described above in connection with FIGS. 5A and/or 5B. For example, the UE 120 may transform (e.g., using a first ISFFT) the delay-Doppler symbols of the first SRS transmission mapped to the first time-frequency matrix 810a to generate a plurality of time-frequency symbols. The plurality of time-frequency symbols occupy the N time domain resources and the M frequency domain resources of the first time-frequency matrix 810a (e.g., s2[0] through s2[M-1]).

The UE 120 may then transform the plurality of time-frequency symbols from the time-frequency domain to the time domain to generate a time domain signal for the first SRS transmission. The UE 120 may transmit the time domain signal of the first SRS transmission to the base station 110 in the symbol 804. The UE 120 may transmit the time domain signal of the first SRS transmission using a first antenna port (e.g., Antenna Port 1). The first antenna port may correspond to a first antenna, a first antenna array, or a first antenna panel of the UE 120. Accordingly, the UE 120 transmits the time domain signal of the first SRS transmission using a first antenna, a first antenna array, or a first antenna panel of the UE 120.

The UE 120 precodes the second SRS transmission using the second delay-Doppler precoder to transform the second delay-Doppler matrix 806b to a second time-frequency matrix 810b. The UE 120 may transform (e.g., using an OFDM modulator 514) the second delay-Doppler matrix 806b to a second time-frequency matrix 810b using one or more techniques described above in connection with FIGS. 5A and/or 5B. For example, the UE 120 may transform (e.g., using a second ISFFT) the delay-Doppler symbols of the second SRS transmission mapped to the second time-frequency matrix 810b to generate a plurality of time-frequency symbols. The plurality of time-frequency symbols occupy the N time domain resources and the M frequency domain resources of the second time-frequency matrix 810b (e.g., s4[0] through s4[M-1]).

The UE 120 may then transform the plurality of time-frequency symbols from the time-frequency domain to the time domain to generate a time domain signal for the second SRS transmission. The UE 120 may transmit the time domain signal of the second SRS transmission to the base station 110 in the symbol 804. The UE 120 may transmit the time domain signal of the second SRS transmission using a second antenna port (e.g., Antenna Port 2) that is different from the first antenna port. The second antenna port may correspond to a second antenna (e.g., different from the first antenna), a second antenna array (e.g., different from the first antenna array), or a second antenna panel (e.g., different from the first antenna panel) of the UE 120. Accordingly, the UE 120 transmits the time domain signal of the second SRS transmission using a second antenna, a second antenna array, or a second antenna panel of the UE 120.

The base station 110 may receive the time domain signal of the first SRS transmission and the time domain signal of the second SRS transmission in the symbol 804. The base station 110 may decode the first SRS transmission using a first delay-Doppler decoder (e.g., a first SFFT) and may decode the second SRS transmission using a second delay-Doppler decoder (e.g., a second SFFT). The base station 110 may decode the first SRS transmission and the second SRS transmission using one or more techniques described above in connection with FIGS. 5A and/or 5B. For example, the base station 110 may transform the time domain signal of the first SRS transmission to a plurality of time-frequency domain symbols using an OFDM demodulator 520, and may transform the plurality of time-frequency domain symbols to a plurality of delay-Doppler samples using an OTFS precoder 508 (e.g., a first OTFS precoder 508). The base station 110 may transform the time domain signal of the second SRS transmission to a plurality of time-frequency domain symbols using an OFDM demodulator 520, and may transform the plurality of time-frequency domain symbols to a plurality of delay-Doppler samples using an OTFS decoder 522 (e.g., a second OTFS decoder 522).

As indicated above, FIG. 8 is provided as an example. Other examples may differ from what is described with regard to FIG. 8.

Figure 9:
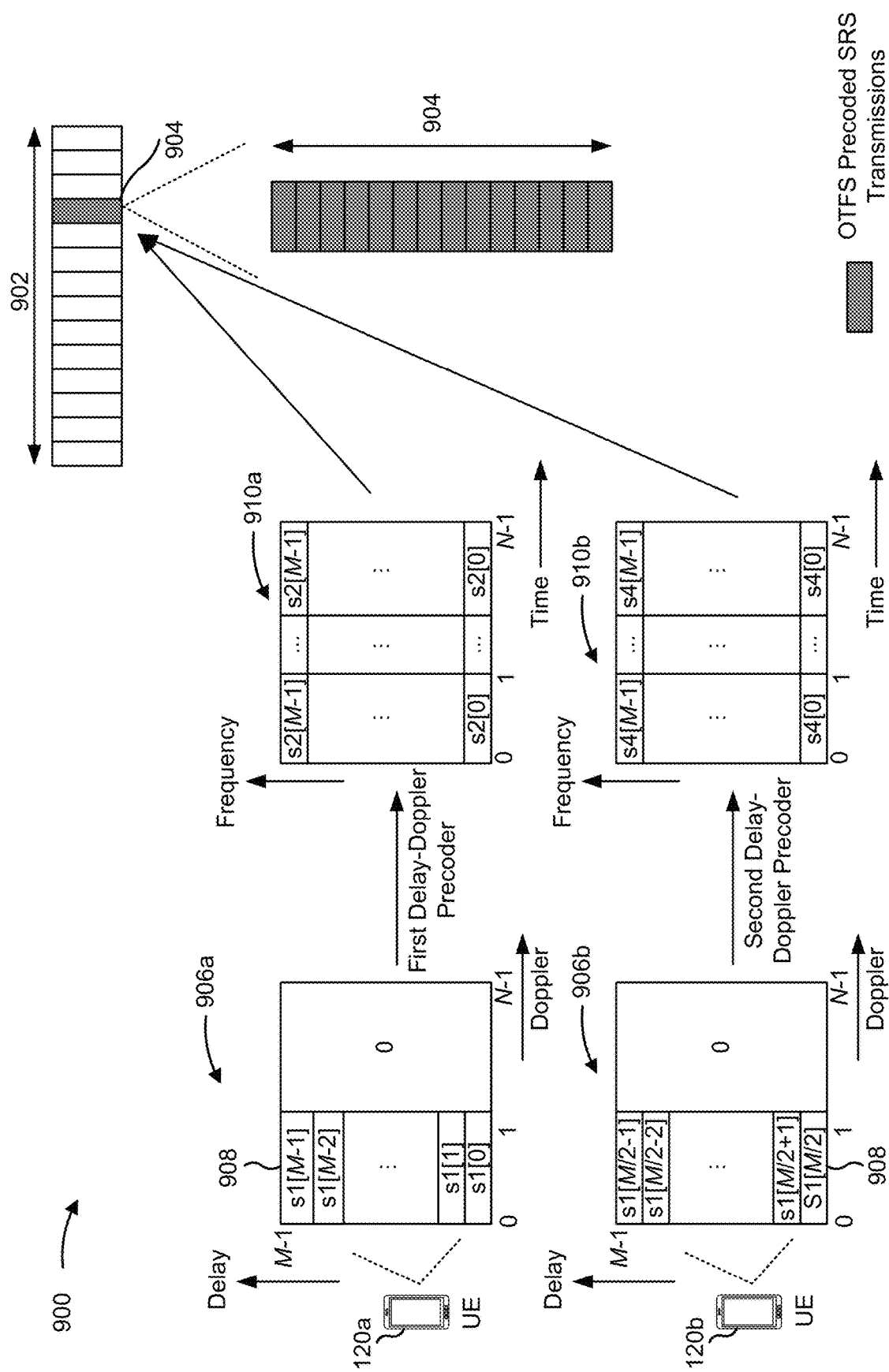

FIG. 9 is a diagram illustrating an example 900 of OTFS precoding and decoding of SRS transmissions, in accordance with the present disclosure. In particular, the example 900 includes an example of OTFS precoding and decoding of a plurality of SRS transmissions by a UE 120a and a UE 120b to a base station 110. In particular, the UE 120a transmits a first SRS transmission and the UE 120b transmits a second SRS transmission to the base station 110 in an SRS symbol in a slot 902 (e.g., in a symbol 904 included in the slot 902). The example 900 is similar to the example 700 of FIG. 7, except that the UE 120a and the UE 120b both use all of the available delay resources in the first Doppler columns of the respective delay-Doppler matrices. The UE 120a and/or the UE 120b apply a cyclic shift to the delay resources to distinguish the first SRS transmission and the second SRS transmission. In this way, the UE 120a and/or the UE 120b use code division multiplexing (CDM) to enable a plurality of UEs to use the full available delay resources in the delay-Doppler domain for SRS.

As shown in FIG. 9, the UE 120a precodes the first SRS transmission (e.g., after mapping the first SRS transmission to a first delay-Doppler matrix 906a) using a first delay-Doppler precoder (e.g., a first ISFFT precoder) and the UE 120b precodes the second SRS transmission (e.g., after mapping the second SRS transmission to the delay-Doppler matrix 906b) using a second delay-Doppler precoder (e.g., a second ISFFT precoder). The first delay-Doppler precoder and the second delay-Doppler precoder may be different delay-Doppler precoders.

The UE 120a maps the first SRS transmission to a first Doppler resource column (e.g., Doppler resource 1) of the first delay-Doppler matrix 906a, and the UE 120a assigns or uses 0 values in the remaining 2 through N-1 Doppler resource columns. The UE 120a maps the first SRS transmission to the delay resources 908 (e.g., all of the available s1[0] to s1[M-1] resources) in the first Doppler resource column of the first delay-Doppler matrix 906a.

The UE 120b maps the second SRS transmission to a second Doppler resource column (e.g., Doppler resource 1) of the second delay-Doppler matrix 906b, and the UE 120b assigns or uses 0 values in the remaining 2 through N-1 Doppler resource columns. The UE 120b maps the second SRS transmission to the delay resources 908 (e.g., all of the available s3[0] to s3[M-1] resources) in the first Doppler resource column of the second delay-Doppler matrix 906b.

As further shown in FIG. 9, the UE 120b applies a cyclic shift to the delay resources 908 occupied by the second SRS transmission. In some aspects, the UE 120a may also apply a cyclic shift (e.g., a different cyclic shift than the UE 120b) to the delay resources 908 occupied by the first SRS transmission. The cyclic shift (or both cyclic shifts) enable the base station 110 to identify or distinguish the first SRS transmission and the second SRS transmission while enabling the UE 120a and the UE 120b to both use all of the available delay resources 908 of the delay-Doppler domain for SRS.

The UE 120b may apply the cyclic shift to the delay resources 908 occupied by the second SRS transmission using a sequence such as a pseudorandom noise (PN) sequence, a Zadoff-Chu (ZC) sequence, and/or another suitable sequence. The resulting delay resources for the second SRS transmission may correspond to s1[M/2] through s1[M/2-1] delay resources. The UE 120b may determine the cyclic shift to be greater than a maximum delay (e.g., a maximum delay tap) for the uplink channel on which the UE 120b is to transmit the second SRS transmission. In some cases, the total quantity of UEs that may be permitted to CDM SRS transmissions in the symbol 904 may be determined as:

$$M/l_{\tau_{max}}$$

where $l_{\tau_{max}}$ is the maximum delay tap of the uplink channel. In some cases, $l_{\tau_{max}}$ may be determined as $$l_{\tau_{max}} = \tau_{max}(M \, \Delta f)$$

where $\tau_{max}$ is the maximum delay spread and $\Delta f$ is the sub-carrier spacing on the uplink channel.

The UE 120a precodes the first SRS transmission using the first delay-Doppler precoder to transform the first delay-Doppler matrix 906a to a first time-frequency matrix 910a. The UE 120a may transform (e.g., using an OFDM modulator 514) the first delay-Doppler matrix 906a to a first time-frequency matrix 910a using one or more techniques described above in connection with FIGS. 5A and/or 5B. For example, the UE 120a may transform (e.g., using a first ISFFT) the delay-Doppler symbols of the first SRS transmission mapped to the first time-frequency matrix 910a to generate a plurality of time-frequency symbols. The plurality of time-frequency symbols occupy the N time domain resources and the M frequency domain resources of the first time-frequency matrix 910a (e.g., s2[0] through s2[M-1]). The UE 120a may then transform the plurality of time-frequency symbols from the time-frequency domain to the time domain to generate a time domain signal for the first SRS transmission. The UE 120a may transmit the time domain signal of the first SRS transmission to the base station 110 in the symbol 904.

The UE 120b precodes the second SRS transmission using the second delay-Doppler precoder to transform the second delay-Doppler matrix 906b to a second time-frequency matrix 910b. The UE 120b may transform (e.g., using an OFDM modulator 514) the second delay-Doppler matrix 906b to a second time-frequency matrix 910b using one or more techniques described above in connection with FIGS. 5A and/or 5B. For example, the UE 120a may transform (e.g., using a second ISFFT) the delay-Doppler symbols of the second SRS transmission mapped to the second time-frequency matrix 910b to generate a plurality of time-frequency symbols. The plurality of time-frequency symbols occupy the N time domain resources and the M frequency domain resources of the second time-frequency matrix 910b (e.g., s4[0] through s4[M-1]). The UE 120b may then transform the plurality of time-frequency symbols from the time-frequency domain to the time domain to generate a time domain signal for the second SRS transmission. The UE 120b may transmit the time domain signal of the second SRS transmission to the base station 110 in the symbol 904.

The base station 110 may receive the time domain signal of the first SRS transmission and the time domain signal of the second SRS transmission in the symbol 904. The base station 110 may decode the first SRS transmission using a first delay-Doppler decoder (e.g., a first SFFT) and may decode the second SRS transmission using a second delay-Doppler decoder (e.g., a second SFFT). The base station 110 may decode the first SRS transmission and the second SRS transmission using one or more techniques described above in connection with FIGS. 5A and/or 5B. For example, the base station 110 may transform the time domain signal of the first SRS transmission to a plurality of time-frequency domain symbols using an OFDM demodulator 520, and may transform the plurality of time-frequency domain symbols to a plurality of delay-Doppler samples using an OTFS precoder 508 (e.g., a first OTFS precoder 508). The base station 110 may transform the time domain signal of the second SRS transmission to a plurality of time-frequency domain symbols using an OFDM demodulator 520, and may transform the plurality of time-frequency domain symbols to a plurality of delay-Doppler samples using an OTFS decoder 522 (e.g., a second OTFS decoder 522).

As indicated above, FIG. 9 is provided as an example. Other examples may differ from what is described with regard to FIG. 9.

Figure 10:
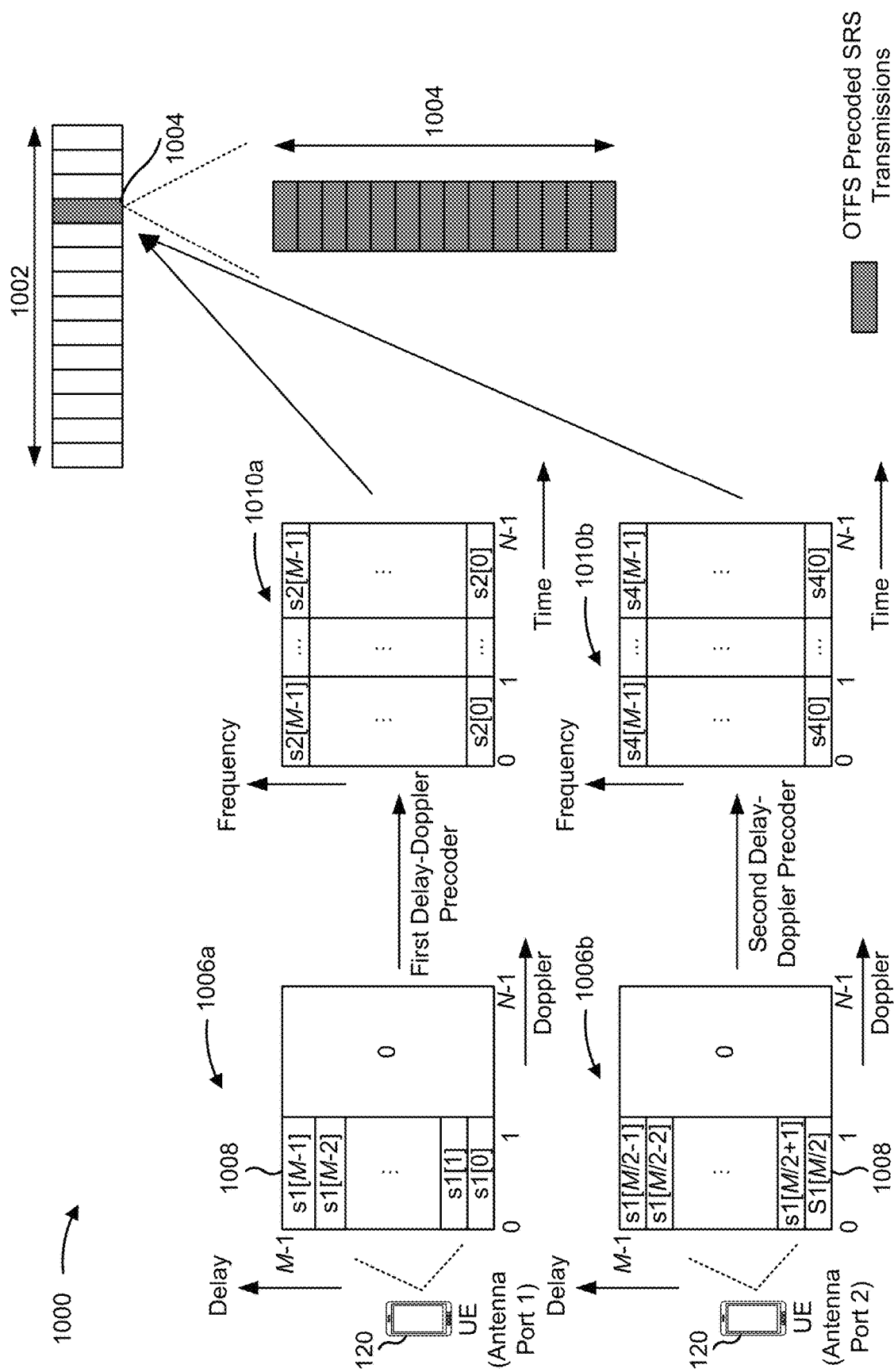

FIG. 10 is a diagram illustrating an example 1000 of OTFS precoding and decoding of SRS transmissions, in accordance with the present disclosure. In particular, the example 1000 includes an example of OTFS precoding and decoding of a plurality of SRS transmissions by a UE 120 to a base station 110. The UE 120 transmits a first SRS transmission and a second SRS transmission to the base station 110 in an SRS symbol in a slot 1002 (e.g., in a symbol 1004 included in the slot 1002). The example 1000 is similar to the example 900 of FIG. 9, except that the UE 120 uses respective (different) antenna ports to transmit the first SRS transmission and the second SRS transmission to the base station 110, as opposed to different UEs transmitting the first SRS transmission and the second SRS transmission. Accordingly, the UE 120 may use the techniques described above in FIG. 9 to precode the first SRS transmission and the second SRS transmission using different delay-Doppler precoders (e.g., different ISFFT precoders).

As shown in FIG. 10, the UE 120 precodes the first SRS transmission (e.g., after mapping the first SRS transmission to a first delay-Doppler matrix 1006a) using a first delay-Doppler precoder (e.g., a first ISFFT precoder) and the UE 120 precodes the second SRS transmission (e.g., after mapping the second SRS transmission to the delay-Doppler matrix 1006b) using a second delay-Doppler precoder (e.g., a second ISFFT precoder). The first delay-Doppler precoder and the second delay-Doppler precoder may be different delay-Doppler precoders.

The UE 120 maps the first SRS transmission to a first Doppler resource column (e.g., Doppler resource 1) of the first delay-Doppler matrix 1006a, and the UE 120 assigns or uses 0 values in the remaining 2 through N-1 Doppler resource columns. The UE 120 maps the first SRS transmission to the delay resources 1008 (e.g., all of the available s1[0] to s1[M-1] delay resources) in the first Doppler resource column of the first delay-Doppler matrix 1006a.

The UE 120 maps the second SRS transmission to a second Doppler resource column (e.g., Doppler resource 1) of the second delay-Doppler matrix 1006b, and the UE 120 assigns or uses 0 values in the remaining 2 through N-1 Doppler resource columns. The UE 120 maps the second SRS transmission to the delay resources 1008 (e.g., all of the available s3[0] to s3[M-1] delay resources) in the first Doppler resource column of the second delay-Doppler matrix 1006b.

As further shown in FIG. 10, the UE 120 applies a cyclic shift to the delay resources 1008 occupied by the second SRS transmission. In some aspects, the UE 120 may also apply a cyclic shift (e.g., a different cyclic shift than the cyclic shift for the second SRS transmission) to the delay resources 1008 occupied by the first SRS transmission. The cyclic shift enables (or both cyclic shifts enable) the base station 110 to identify or distinguish the first SRS transmission and the second SRS transmission while enabling the UE 120 to use all of the available delay resources 1008 of the delay-Doppler domain for both SRS transmissions.

The UE 120 may apply the cyclic shift to the delay resources 1008 occupied by the second SRS transmission using a sequence such as a pseudorandom noise sequence, a Zadoff-Chu sequence, and/or another suitable sequence. The resulting delay resources for the second SRS transmission may correspond to s1[M/2] through s1[M/2-1] delay resources.

The UE 120 precodes the first SRS transmission using the first delay-Doppler precoder to transform the first delay-Doppler matrix 1006a to a first time-frequency matrix 1010a. The UE 120 may transform (e.g., using an OFDM modulator 514) the first delay-Doppler matrix 1006a to a first time-frequency matrix 1010a using one or more techniques described above in connection with FIGS. 5A and/or 5B. For example, the UE 120 may transform (e.g., using a first ISFFT) the delay-Doppler symbols of the first SRS transmission mapped to the first time-frequency matrix 1010a to generate a plurality of time-frequency symbols. The plurality of time-frequency symbols occupy the N time domain resources and the M frequency domain resources of the first time-frequency matrix 1010a (e.g., s2[0] through s2[M-1]).

The UE 120 may then transform the plurality of time-frequency symbols from the time-frequency domain to the time domain to generate a time domain signal for the first SRS transmission. The UE 120 may transmit the time domain signal of the first SRS transmission to the base station 110 in the symbol 1004. The UE 120 may transmit the time domain signal of the first SRS transmission using a first antenna port (e.g., Antenna Port 1). The first antenna port may correspond to a first antenna, a first antenna array, or a first antenna panel of the UE 120. Accordingly, the UE 120 transmits the time domain signal of the first SRS transmission using a first antenna, a first antenna array, or a first antenna panel of the UE 120.

The UE 120 precodes the second SRS transmission using the second delay-Doppler precoder to transform the second delay-Doppler matrix 1006b to a second time-frequency matrix 1010b. The UE 120 may transform (e.g., using an OFDM modulator 514) the second delay-Doppler matrix 1006b to a second time-frequency matrix 1010b using one or more techniques described above in connection with FIGS. 5A and/or 5B. For example, the UE 120 may transform (e.g., using a second ISFFT) the delay-Doppler symbols of the second SRS transmission mapped to the second time-frequency matrix 1010b to generate a plurality of time-frequency symbols. The plurality of time-frequency symbols occupy the N time domain resources and the M frequency domain resources of the second time-frequency matrix 1010b (e.g., s4[0] through s4[M-1]).

The UE 120 may then transform the plurality of time-frequency symbols from the time-frequency domain to the time domain to generate a time domain signal for the second SRS transmission. The UE 120 may transmit the time domain signal of the second SRS transmission to the base station 110 in the symbol 1004. The UE 120 may transmit the time domain signal of the second SRS transmission using a second antenna port (e.g., Antenna Port 2) that is different from the first antenna port. The second antenna port may correspond to a second antenna (e.g., different from the first antenna), a second antenna array (e.g., different from the first antenna array), or a second antenna panel (e.g., different from the first antenna panel) of the UE 120. Accordingly, the UE 120 transmits the time domain signal of the second SRS transmission using a second antenna, a second antenna array, or a second antenna panel of the UE 120.

The base station 110 may receive the time domain signal of the first SRS transmission and the time domain signal of the second SRS transmission in the symbol 1004. The base station 110 may decode the first SRS transmission using a first delay-Doppler decoder (e.g., a first SFFT) and may decode the second SRS transmission using a second delay-Doppler decoder (e.g., a second SFFT). The base station 110 may decode the first SRS transmission and the second SRS transmission using one or more techniques described above in connection with FIGS. 5A and/or 5B. For example, the base station 110 may transform the time domain signal of the first SRS transmission to a plurality of time-frequency domain symbols using an OFDM demodulator 520, and may transform the plurality of time-frequency domain symbols to a plurality of delay-Doppler samples using an OTFS precoder 508 (e.g., a first OTFS precoder 508). The base station 110 may transform the time domain signal of the second SRS transmission to a plurality of time-frequency domain symbols using an OFDM demodulator 520, and may transform the plurality of time-frequency domain symbols to a plurality of delay-Doppler samples using an OTFS decoder 522 (e.g., a second OTFS decoder 522).

As indicated above, FIG. 10 is provided as an example. Other examples may differ from what is described with regard to FIG. 10.

Figure 11:
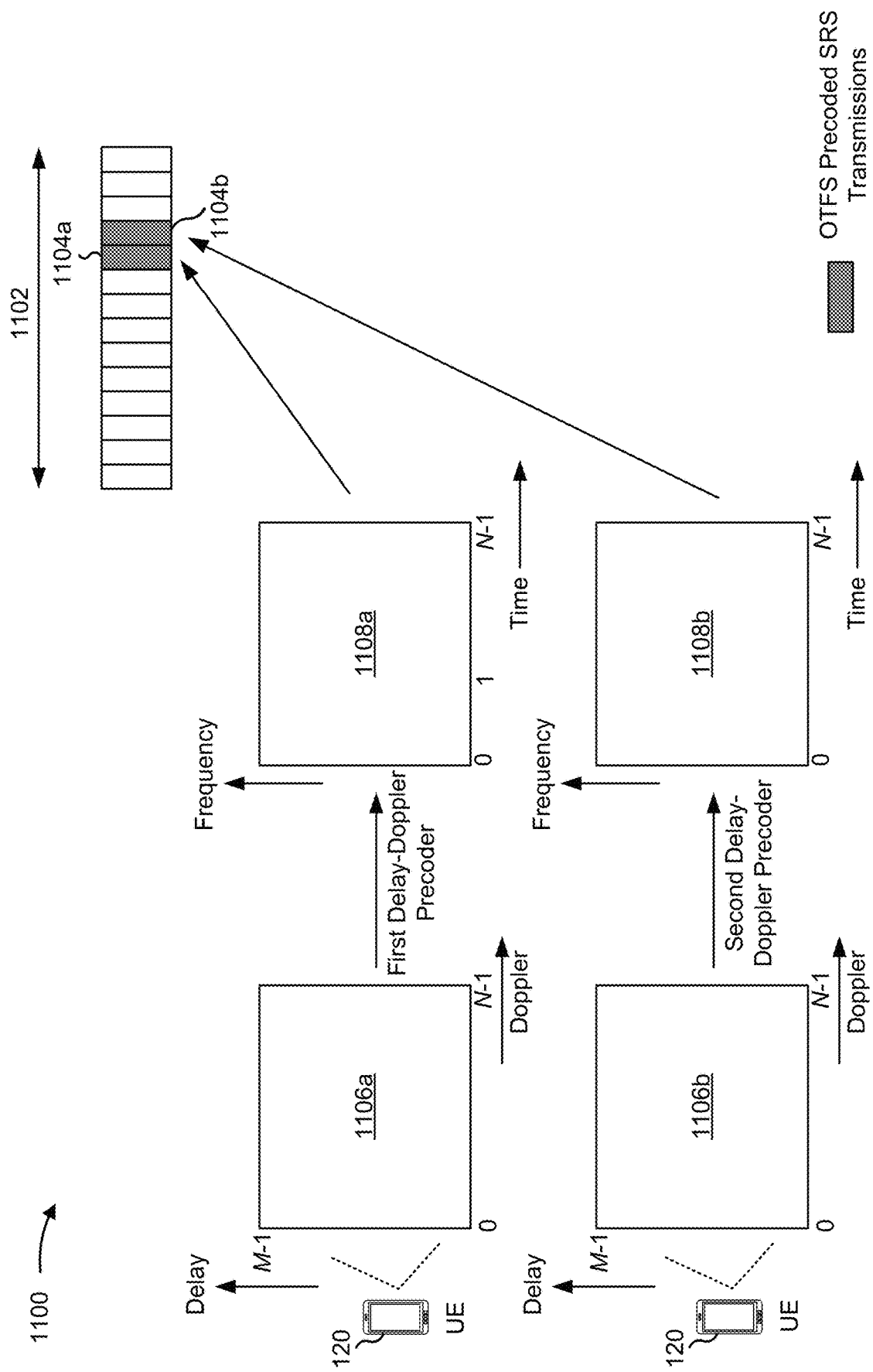

FIG. 11 is a diagram illustrating an example 1100 of OTFS precoding and decoding of SRS transmissions, in accordance with the present disclosure. The example 1100 includes an example of OTFS precoding and decoding of a plurality of SRS transmissions by a UE 120 to a base station 110. In particular, the UE 120 transmits a first SRS transmission and a second SRS transmission to the base station 110 in a plurality of SRS symbols in a slot 1102. For example, the UE 120 may transmit the first SRS transmission in a first symbol 1104a included in the slot 1102, and may transmit the second SRS transmission in a second symbol 1104b in the slot 1102.

As shown in FIG. 11, the UE 120 may precode the first SRS transmission using a first delay-Doppler precoder (e.g., a first ISFFT or another type of OTFS precoder) and may precode the second SRS transmission using a second delay-Doppler precoder (e.g., a second ISFFT or another type of OTFS precoder). The first delay-Doppler precoder and the second delay-Doppler precoder may be different precoders.

The UE 120 may use a first delay-Doppler matrix 1106a to precode the first SRS transmission and may use a second delay-Doppler matrix 1106b to precode the second SRS transmission. The UE 120 may use one or more of the delay resource usage techniques described above in connection with FIGS. 7-10 to share delay resources for the first SRS transmission and/or for the second SRS transmission. For example, the UE 120 may use a subset of available delay resources in the first delay-Doppler matrix 1106a (e.g., to share the available delay resources with another UE 120 in the first symbol 1104a) or may use all of the available delay resources (e.g., with or without using a cyclic shift). Similarly, the UE 120 may use a subset of available delay resources in the second delay-Doppler matrix 1106b (e.g., to share the available delay resources with another UE 120 in the second symbol 1104b) or may use all of the available delay resources (e.g., with or without using a cyclic shift).

The UE 120 precodes the first SRS transmission using the first delay-Doppler precoder to transform the first delay-Doppler matrix 1106a to a first time-frequency matrix 1108a. The UE 120 may transform (e.g., using an OFDM modulator 514) the first delay-Doppler matrix 1106a to a first time-frequency matrix 1108a using one or more techniques described above in connection with FIGS. 5A and/or 5B. For example, the UE 120 may transform (e.g., using a first ISFFT) the delay-Doppler symbols of the first SRS transmission mapped to the first time-frequency matrix 1108a to generate a plurality of time-frequency symbols.

The UE 120 may then transform the plurality of time-frequency symbols from the time-frequency domain to the time domain to generate a time domain signal for the first SRS transmission. The UE 120 may transmit the time domain signal of the first SRS transmission to the base station 110 in the first symbol 1104a. In some aspects, the UE 120 transmits the time domain signal of the first SRS transmission using a first antenna port (e.g., Antenna Port 1). The first antenna port may correspond to a first antenna, a first antenna array, or a first antenna panel of the UE 120. Accordingly, the UE 120 may transmit the time domain signal of the first SRS transmission using a first antenna, a first antenna array, or a first antenna panel of the UE 120.

The UE 120 precodes the second SRS transmission using the second delay-Doppler precoder to transform the second delay-Doppler matrix 1106b to a second time-frequency matrix 1108b. The UE 120 may transform (e.g., using an OFDM modulator 514) the second delay-Doppler matrix 1106b to a second time-frequency matrix 1108b using one or more techniques described above in connection with FIGS. 5A and/or 5B. For example, the UE 120 may transform (e.g., using a second ISFFT) the delay-Doppler symbols of the second SRS transmission mapped to the second time-frequency matrix 1108b to generate a plurality of time-frequency symbols.

The UE 120 may then transform the plurality of time-frequency symbols from the time-frequency domain to the time domain to generate a time domain signal for the second SRS transmission. The UE 120 may transmit the time domain signal of the second SRS transmission to the base station 110 in the second symbol 1104b. In some aspects, the UE 120 transmits the time domain signal of the second SRS transmission using a same antenna port as the first SRS transmission. In some aspects, the UE 120 transmits the time domain signal of the second SRS transmission using a second antenna port (e.g., Antenna Port 2) that is different from the first antenna port. The second antenna port may correspond to a second antenna (e.g., different from the first antenna), a second antenna array (e.g., different from the first antenna array), or a second antenna panel (e.g., different from the first antenna panel) of the UE 120. Accordingly, the UE 120 transmits the time domain signal of the second SRS transmission using a second antenna, a second antenna array, or a second antenna panel of the UE 120.

The base station 110 may receive the time domain signal of the first SRS transmission in the first symbol 1104a, and may receive the time domain signal of the second SRS transmission in the second symbol 1104b. The base station 110 may decode the first SRS transmission using a first delay-Doppler decoder (e.g., a first SFFT) and may decode the second SRS transmission using a second delay-Doppler decoder (e.g., a second SFFT). The base station 110 may decode the first SRS transmission and the second SRS transmission using one or more techniques described above in connection with FIGS. 5A and/or 5B. For example, the base station 110 may transform the time domain signal of the first SRS transmission to a plurality of time-frequency domain symbols using an OFDM demodulator 520, and may transform the plurality of time-frequency domain symbols to a plurality of delay-Doppler samples using an OTFS precoder 508 (e.g., a first OTFS precoder 508). The base station 110 may transform the time domain signal of the second SRS transmission to a plurality of time-frequency domain symbols using an OFDM demodulator 520, and may transform the plurality of time-frequency domain symbols to a plurality of delay-Doppler samples using an OTFS decoder 522 (e.g., a second OTFS decoder 522).

As indicated above, FIG. 11 is provided as an example. Other examples may differ from what is described with regard to FIG. 11.

Figure 12:
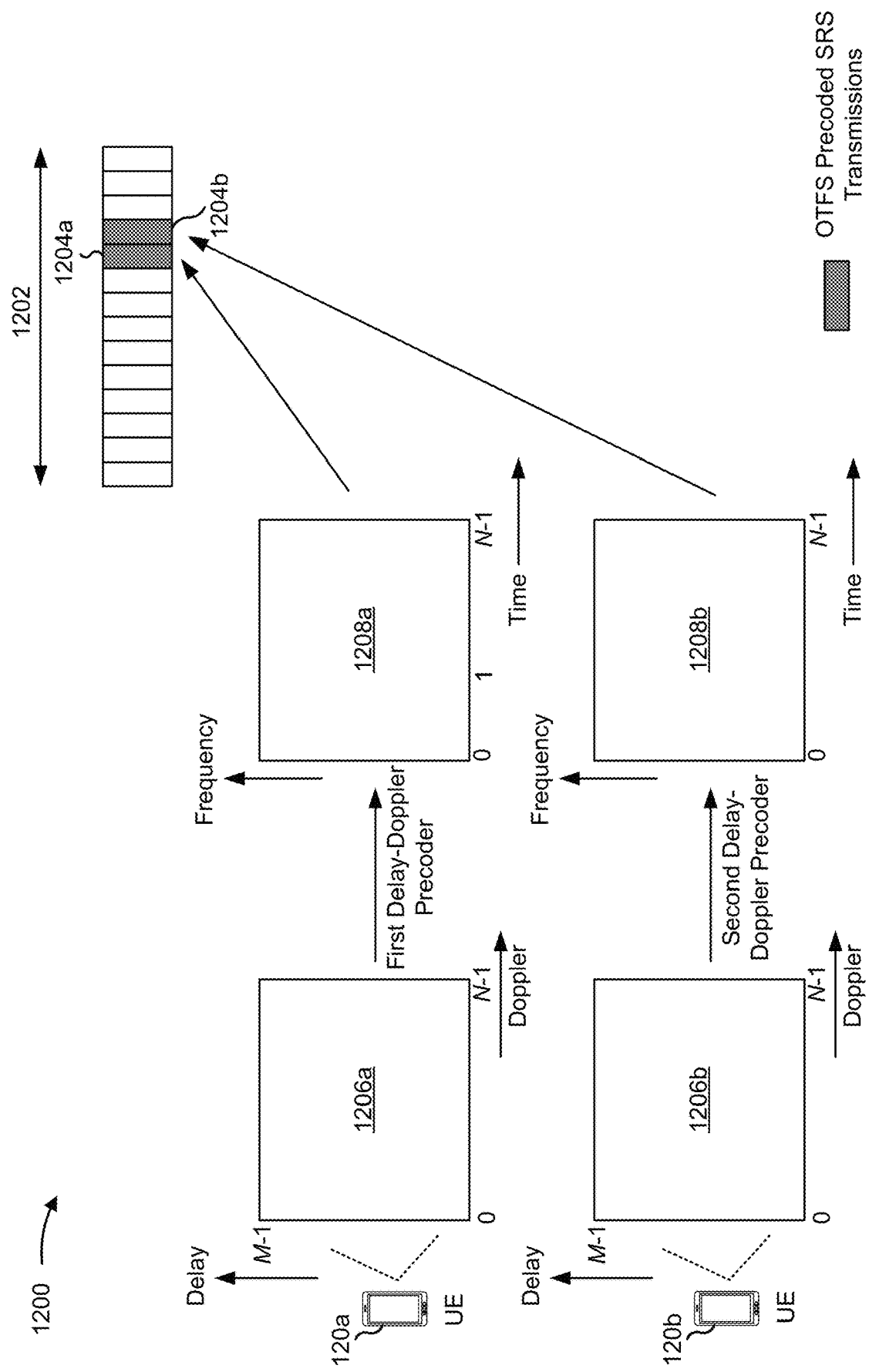

FIG. 12 is a diagram illustrating an example 1200 of OTFS precoding and decoding of SRS transmissions, in accordance with the present disclosure. The example 1200 includes an example of OTFS precoding and decoding of a plurality of SRS transmissions by a plurality of UEs 120 (e.g., UE 120a and UE 120b) to a base station 110. In particular, the UE 120a transmits a first SRS transmission and the UE 120b transmits a second SRS transmission to the base station 110 in a plurality of SRS symbols in a slot 1202. For example, the UE 120a may transmit the first SRS transmission in a first symbol 1204a included in the slot 1202, and may transmit the second SRS transmission in a second symbol 1204b in the slot 1202.

As shown in FIG. 12, the UE 120a may precode the first SRS transmission using a first delay-Doppler precoder (e.g., a first ISFFT or another type of OTFS precoder). The UE 120b may precode the second SRS transmission using a second delay-Doppler precoder (e.g., a second ISFFT or another type of OTFS precoder). The first delay-Doppler precoder and the second delay-Doppler precoder may be different precoders.

The UE 120a may use a first delay-Doppler matrix 1206a to precode the first SRS transmission. The UE 120a may use one or more of the delay resource usage techniques described above in connection with FIGS. 7-10 to share delay resources for the first SRS transmission in the symbol 1204a. For example, the UE 120a may use a subset of available delay resources in the first delay-Doppler matrix 1206a (e.g., to share the available delay resources with another UE 120 in the first symbol 1204a) or may use all of the available delay resources (e.g., with or without using a cyclic shift).

The UE 120b may use a second delay-Doppler matrix 1206b to precode the second SRS transmission. The UE 120b may use one or more of the delay resource usage techniques described above in connection with FIGS. 7-10 to share delay resources for the second SRS transmission. For example, the UE 120b may use a subset of available delay resources in the second delay-Doppler matrix 1206b (e.g., to share the available delay resources with another UE 120 in the second symbol 1204b) or may use all of the available delay resources (e.g., with or without using a cyclic shift).

The UE 120a precodes the first SRS transmission using the first delay-Doppler precoder to transform the first delay-Doppler matrix 1206a to a first time-frequency matrix 1208a. The UE 120a may transform (e.g., using an OFDM modulator 514) the first delay-Doppler matrix 1206a to a first time-frequency matrix 1208a using one or more techniques described above in connection with FIGS. 5A and/or 5B. For example, the UE 120a may transform (e.g., using a first ISFFT) the delay-Doppler symbols of the first SRS transmission mapped to the first time-frequency matrix 1208a to generate a plurality of time-frequency symbols. The UE 120a may then transform the plurality of time-frequency symbols from the time-frequency domain to the time domain to generate a time domain signal for the first SRS transmission. The UE 120a may transmit the time domain signal of the first SRS transmission to the base station 110 in the first symbol 1204a.

The UE 120b precodes the second SRS transmission using the second delay-Doppler precoder to transform the second delay-Doppler matrix 1206b to a second time-frequency matrix 1208b. The UE 120b may transform (e.g., using an OFDM modulator 514) the second delay-Doppler matrix 1206b to a second time-frequency matrix 1208b using one or more techniques described above in connection with FIGS. 5A and/or 5B. For example, the UE 120b may transform (e.g., using a second ISFFT) the delay-Doppler symbols of the second SRS transmission mapped to the second time-frequency matrix 1208b to generate a plurality of time-frequency symbols. The UE 120b may then transform the plurality of time-frequency symbols from the time-frequency domain to the time domain to generate a time domain signal for the second SRS transmission. The UE 120b may transmit the time domain signal of the second SRS transmission to the base station 110 in the second symbol 1204b.

The base station 110 may receive the time domain signal of the first SRS transmission in the first symbol 1204a, and may receive the time domain signal of the second SRS transmission in the second symbol 1204b. The base station 110 may decode the first SRS transmission using a first delay-Doppler decoder (e.g., a first SFFT) and may decode the second SRS transmission using a second delay-Doppler decoder (e.g., a second SFFT). The base station 110 may decode the first SRS transmission and the second SRS transmission using one or more techniques described above in connection with FIGS. 5A and/or 5B. For example, the base station 110 may transform the time domain signal of the first SRS transmission to a plurality of time-frequency domain symbols using an OFDM demodulator 520, and may transform the plurality of time-frequency domain symbols to a plurality of delay-Doppler samples using an OTFS precoder 508 (e.g., a first OTFS precoder 508). The base station 110 may transform the time domain signal of the second SRS transmission to a plurality of time-frequency domain symbols using an OFDM demodulator 520, and may transform the plurality of time-frequency domain symbols to a plurality of delay-Doppler samples using an OTFS decoder 522 (e.g., a second OTFS decoder 522).

As indicated above, FIG. 12 is provided as an example. Other examples may differ from what is described with regard to FIG. 12.

In some aspects, a base station 110 may transmit a configuration to one or more UEs 120. The configuration may indicate that a UE 120 is (or a plurality of UEs 120 are) to use one or more of the OTFS precoding techniques described above in connection with FIGS. 7-12. The configuration may include a semi-static configuration (e.g., transmitted in a radio resource control (RRC) communication or a medium access control (MAC) control element (MAC-CE) communication), a dynamic configuration (e.g., transmitted in a downlink control information (DCI) communication), and/or another type of configuration. The configuration may indicate a delay resource usage technique for precoding SRS transmissions, a delay resource allocation for precoding SRS transmissions, and/or another SRS transmission precoding parameter, among other examples. UE(s) 120 may precode SRS transmissions based at least in part on the configuration.

In some aspects, a delay resource usage technique for precoding SRS transmissions may include a delay resource sharing technique (e.g., as described in connection with FIGS. 7 and 8) where a plurality of UEs 120 (or a plurality of antenna ports of a UE 120) are allocated respective (different) subsets of delay resources for SRS transmission. In some aspects, a delay resource usage technique for precoding SRS transmissions may include a delay resource sharing technique (e.g., as described in connection with FIGS. 9 and 10) where a plurality of UEs 120 (or a plurality of antenna ports of a UE 120) are allocated full delay resource usage for SRS transmission, and a cyclic shift is applied by one or more UEs 120 (or applied to one or more antenna ports of a UE 120). Other delay resource usage techniques are within the scope of the present disclosure. UE(s) 120 may precode SRS transmissions based at least in part on the delay resource usage technique.

In some aspects, a delay resource allocation for precoding SRS transmissions may indicate a subset of delay resources (e.g., X delay resources, Y delay resources) for delay resource sharing among a plurality of UEs 120 (or among a plurality of antenna ports of a UE 120). In some aspects, a delay resource allocation for precoding SRS transmissions may indicate a cyclic shift that is to be applied to delay resources where a plurality of UEs 120 (or where a plurality of antenna ports of a UE 120) occupy an entire set of delay resources for SRS transmission. Other delay resource allocations are within the scope of the present disclosure. UE(s) 120 may precode SRS transmissions based at least in part on the delay resource usage allocation(s).

In some aspects, a configuration may indicate that a UE 120 is to transmit SRS transmissions across a block of symbols. However, SRS processing may be performed at an individual symbol level as well. Block level processing may be used for channel estimation, Doppler estimation, and/or type tracking, among other examples. Symbol level processing may be used for slot-by-slot tracking updates and/or beam management, among other examples.

In some aspects, base station 110 may determine or generate a configuration, a delay resource usage technique, and/or a delay resource allocation based on an indication of a UE capability associated with a UE 120. The UE 120 may transmit the indication of the UE capability to the base station 110. The UE capability may indicate, for example, a capability to apply cyclic shifts to SRS transmissions, cyclic shift type capabilities, SRS transmission capabilities, and/or other capabilities associated with SRS.

Figure 13:
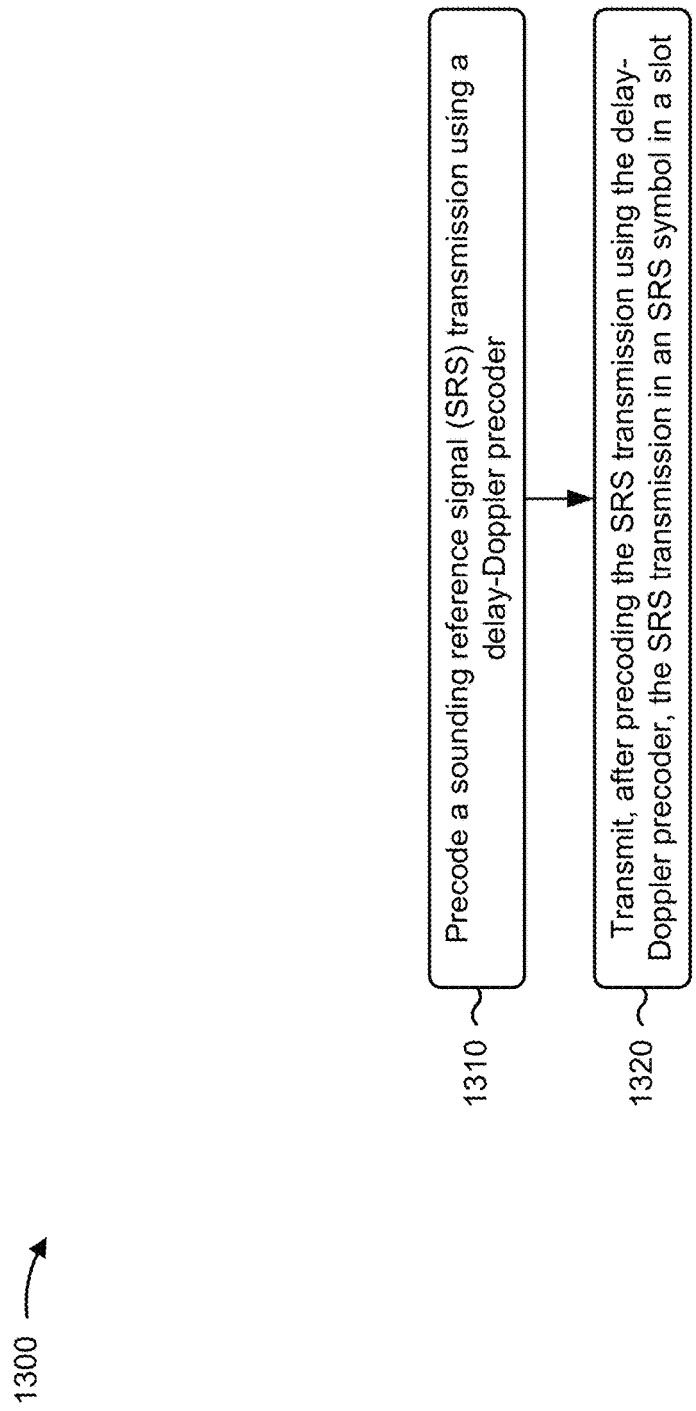
FIGS. 13 is a diagram illustrating an example process associated with of OTFS precoding of SRS transmissions, in accordance with the present disclosure.

FIG. 13 is a diagram illustrating an example process 1300 performed, for example, by a UE, in accordance with the present disclosure. Example process 1300 is an example where the UE (e.g., UE 120) performs operations associated with OTFS precoding of SRS transmissions.

As shown in FIG. 13, in some aspects, process 1300 may include precoding an SRS transmission using a delay-Doppler precoder (block 1310). For example, the UE (e.g., using communication manager 140 and/or precoding component 1508, depicted in FIG. 15) may precode an SRS transmission using a delay-Doppler precoder, as described above.

As further shown in FIG. 13, in some aspects, process 1300 may include transmitting, after precoding the SRS transmission using the delay-Doppler precoder, the SRS transmission in an SRS symbol in a slot (block 1320). For example, the UE (e.g., using communication manager 140 and/or transmission component 1504, depicted in FIG. 15) may transmit, after precoding the SRS transmission using the delay-Doppler precoder, the SRS transmission in an SRS symbol in a slot, as described above.

Process 1300 may include additional aspects, such as any single aspect or any combination of aspects described below and/or in connection with one or more other processes described elsewhere herein.

In a first aspect, precoding the SRS transmission using the delay-Doppler precoder comprises precoding the SRS transmission in a first subset of delay resources for the SRS symbol, wherein the first subset of delay resources are orthogonal to a second subset of the delay resources for the SRS symbol.

In a second aspect, alone or in combination with the first aspect, the delay resources are included in a first Doppler column of a delay-Doppler matrix, and precoding the SRS transmission using the delay-Doppler precoder comprises precoding the SRS transmission using 0-values for additional delay resources in one or more second Doppler columns of the delay-Doppler matrix for the SRS symbol.

In a third aspect, alone or in combination with one or more of the first and second aspects, precoding the SRS transmission using the delay-Doppler precoder comprises precoding the SRS transmission in a plurality of delay resources, for the SRS symbol, in which the SRS transmission is code division multiplexed with another SRS transmission.

In a fourth aspect, alone or in combination with one or more of the first through third aspects, the plurality of delay resources are included in a first Doppler column of a delay-Doppler matrix, and precoding the SRS transmission using the delay-Doppler precoder comprises precoding the SRS transmission using 0-values for additional delay resources in one or more second Doppler columns of the delay-Doppler matrix for the SRS symbol.

In a fifth aspect, alone or in combination with one or more of the first through fourth aspects, precoding the SRS transmission using the delay-Doppler precoder comprises using a sequence to apply a cyclic shift to the SRS transmission in the plurality of delay resources, wherein the sequence comprises at least one of a Zadoff-Chu sequence, or a pseudorandom noise sequence.

In a sixth aspect, alone or in combination with one or more of the first through fifth aspects, the cyclic shift is greater than a maximum delay for a channel on which the SRS transmission is to be transmitted.

In a seventh aspect, alone or in combination with one or more of the first through sixth aspects, process 1300 includes precoding another SRS transmission using another delay-Doppler precoder, and transmitting, after precoding the other SRS transmission using the other delay-Doppler precoder, the other SRS transmission in another SRS symbol in the slot, wherein the SRS symbol and the other SRS symbol are adjacent SRS symbols in the slot.

In an eighth aspect, alone or in combination with one or more of the first through seventh aspects, precoding the other SRS transmission using the other delay-Doppler precoder comprises precoding the other SRS transmission in a first subset of delay resources for the other SRS symbol, wherein the first subset of delay resources are orthogonal to a second subset of the delay resources for the other SRS symbol.

In a ninth aspect, alone or in combination with one or more of the first through eighth aspects, precoding the other SRS transmission using the other delay-Doppler precoder comprises precoding the other SRS transmission in a plurality of delay resources, for the other SRS symbol, in which the other SRS transmission is code division multiplexed in the plurality of delay resources.

In a tenth aspect, alone or in combination with one or more of the first through ninth aspects, transmitting the SRS transmission comprises transmitting the SRS transmission in the SRS symbol using a first antenna port, and process 1300 includes precoding another SRS transmission using another delay-Doppler precoder, and transmitting, after precoding the other SRS transmission using the other delay-Doppler precoder, the other SRS transmission in another SRS symbol in the slot using a second antenna port, wherein the SRS symbol and the other SRS symbol are adjacent SRS symbols in the slot.

In an eleventh aspect, alone or in combination with one or more of the first through tenth aspects, precoding the other SRS transmission using the other delay-Doppler precoder comprises precoding the other SRS transmission based at least in part on a semi-static configuration or a dynamic configuration.

In a twelfth aspect, alone or in combination with one or more of the first through eleventh aspects, process 1300 includes transmitting an indication of a UE capability associated with the UE, and receiving, based at least in part on the UE capability, the semi-static configuration or the dynamic configuration.

In a thirteenth aspect, alone or in combination with one or more of the first through twelfth aspects, the semi-static configuration or the dynamic configuration indicates at least one of a delay resource usage technique for precoding the SRS transmission, or a delay resource allocation for the SRS transmission.

In a fourteenth aspect, alone or in combination with one or more of the first through thirteenth aspects, the delay-Doppler precoder comprises an ISFFT precoder.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
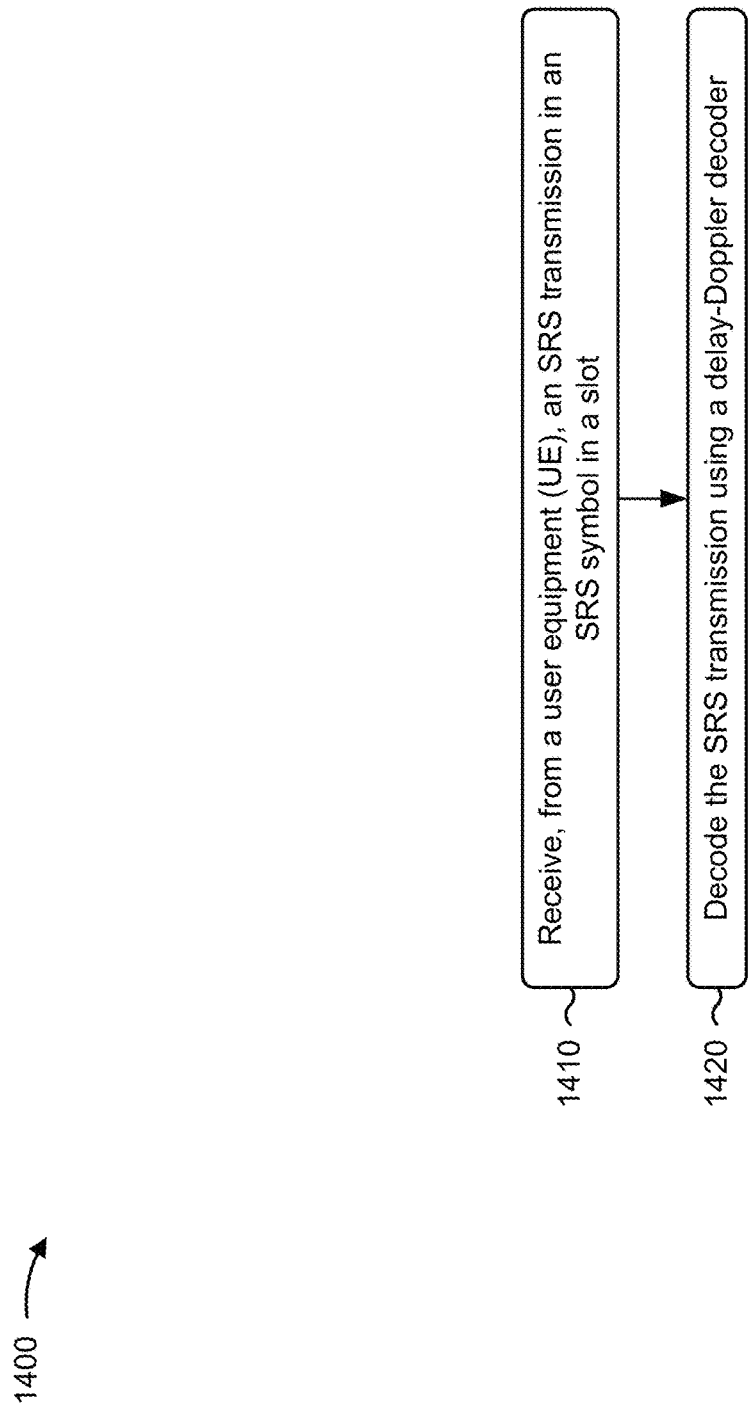
FIGS. 14 is a diagram illustrating an example process associated with of OTFS decoding of SRS transmissions, in accordance with the present disclosure.

FIG. 14 is a diagram illustrating an example process 1400 performed, for example, by a base station, in accordance with the present disclosure. Example process 1400 is an example where the base station (e.g., base station 110) performs operations associated with OTFS decoding of SRS transmissions.

As shown in FIG. 14, in some aspects, process 1400 may include receiving, from a UE, an SRS transmission in an SRS symbol in a slot (block 1410). For example, the base station (e.g., using communication manager 150 and/or reception component 1602, depicted in FIG. 16) may receive, from a UE, an SRS transmission in an SRS symbol in a slot, as described above.

As further shown in FIG. 14, in some aspects, process 1400 may include decoding the SRS transmission using a delay-Doppler decoder (block 1420). For example, the base station (e.g., using communication manager 150 and/or decoding component 1608, depicted in FIG. 16) may decode the SRS transmission using a delay-Doppler decoder, as described above.

Process 1400 may include additional aspects, such as any single aspect or any combination of aspects described below and/or in connection with one or more other processes described elsewhere herein.

In a first aspect, process 1400 includes receiving, from another UE, another SRS transmission in the SRS symbol in the slot, and decoding the other SRS transmission using another delay-Doppler decoder.

In a second aspect, alone or in combination with the first aspect, decoding the SRS transmission using the delay-Doppler decoder comprises decoding the SRS transmission into a first subset of delay resources for the SRS symbol, and decoding the other SRS transmission using the other delay-Doppler decoder comprises decoding the other SRS transmission into a second subset of delay resources for the SRS symbol, wherein the first subset of delay resources and the second subset of delay resources are orthogonal in a first Doppler column for the SRS symbol.

In a third aspect, alone or in combination with one or more of the first and second aspects, decoding the SRS transmission using the delay-Doppler decoder comprises decoding the SRS transmission into a plurality of delay resources for the SRS symbol, and decoding the other SRS transmission using the other delay-Doppler decoder comprises decoding the other SRS transmission into the plurality of delay resources for the SRS symbol, wherein the SRS transmission is cyclic shifted relative to the other SRS transmission.

In a fourth aspect, alone or in combination with one or more of the first through third aspects, process 1400 includes receiving, from the UE, another SRS transmission in another SRS symbol in the slot, wherein the SRS symbol and the other SRS symbol are adjacent symbols in the slot, and decoding the other SRS transmission using another delay-Doppler decoder.

In a fifth aspect, alone or in combination with one or more of the first through fourth aspects, process 1400 includes receiving, from another UE, another SRS transmission in another SRS symbol in the slot, wherein the SRS symbol and the other SRS symbol are adjacent symbols in the slot, and decoding the other SRS transmission using another delay-Doppler decoder.

In a sixth aspect, alone or in combination with one or more of the first through fifth aspects, process 1400 includes receiving, from the UE, another SRS transmission in the SRS symbol in the slot, and decoding the other SRS transmission using another delay-Doppler decoder, wherein the SRS transmission is associated with a first antenna port of the UE, and wherein the other SRS transmission is associated with a second antenna port of the UE.

In a seventh aspect, alone or in combination with one or more of the first through sixth aspects, decoding the SRS transmission using the delay-Doppler decoder comprises decoding the SRS transmission into a first subset of delay resources for the SRS symbol, and decoding the other SRS transmission using the other delay-Doppler decoder comprises decoding the other SRS transmission into a second subset of delay resources for the SRS symbol, wherein the first subset of delay resources and the second subset of delay resources are orthogonal in a first Doppler column for the SRS symbol.

In an eighth aspect, alone or in combination with one or more of the first through seventh aspects, decoding the SRS transmission using the delay-Doppler decoder comprises decoding the SRS transmission into a plurality of delay resources for the SRS symbol, and decoding the other SRS transmission using the other delay-Doppler decoder comprises decoding the other SRS transmission into the plurality of delay resources for the SRS symbol, wherein the SRS transmission is cyclic shifted relative to the other SRS transmission.

In a ninth aspect, alone or in combination with one or more of the first through eighth aspects, process 1400 includes transmitting, to the UE, an OTFS precoding configuration, wherein the OTFS precoding configuration comprises a semi-static configuration or a dynamic configuration.

In a tenth aspect, alone or in combination with one or more of the first through ninth aspects, process 1400 includes receiving an indication of a UE capability associated with the UE, and transmitting, based at least in part on the UE capability, the OTFS precoding configuration.

In an eleventh aspect, alone or in combination with one or more of the first through tenth aspects, the OTFS precoding configuration indicates at least one of a delay resource usage technique for precoding the SRS transmission, or a delay resource allocation for the SRS transmission, wherein the delay resource allocation is based at least in part on at least one of a channel delay spread, or a quantity of resource elements allocated for the SRS symbol.

In a twelfth aspect, alone or in combination with one or more of the first through eleventh aspects, the delay-Doppler decoder comprises an SFFT decoder.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
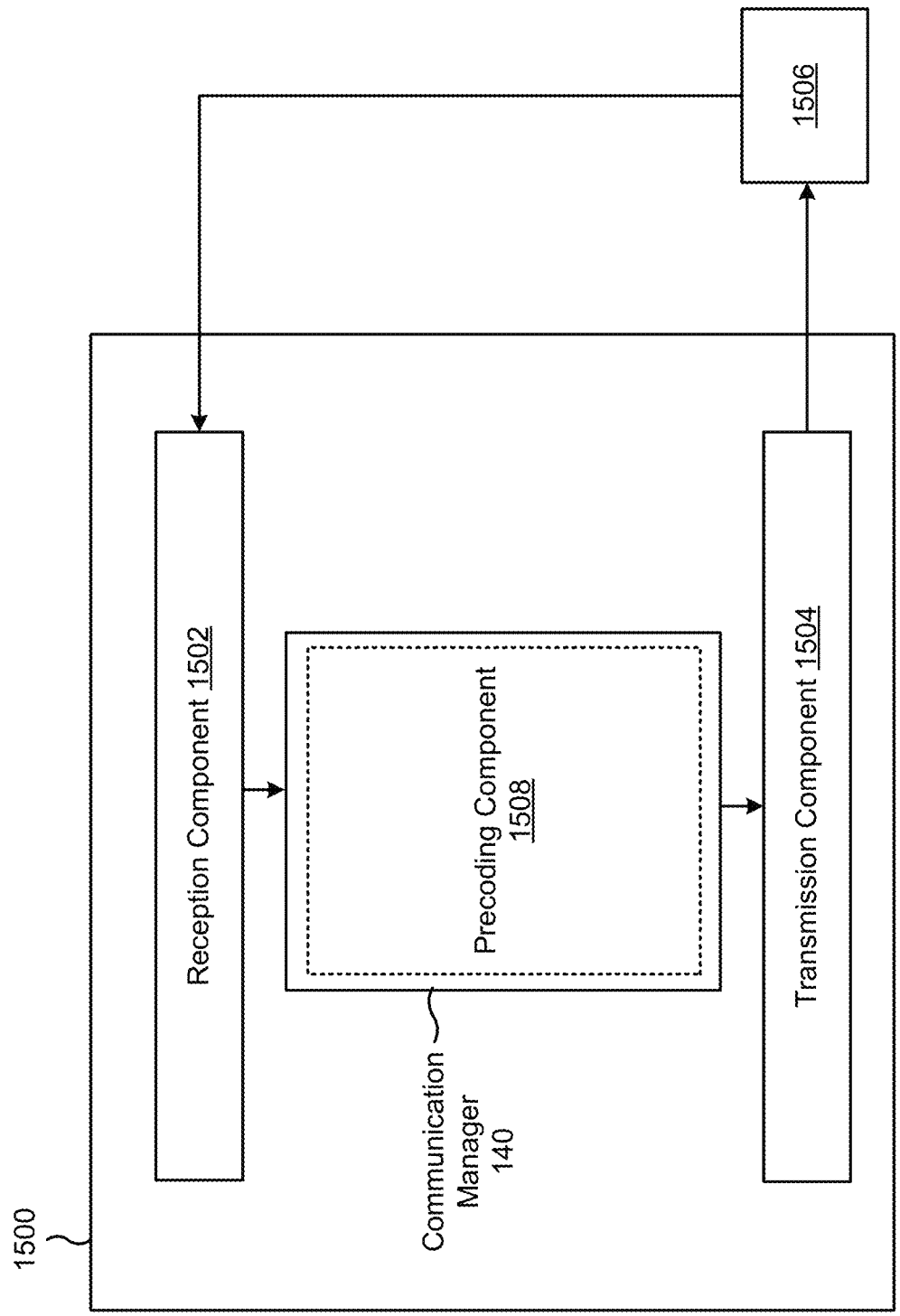
FIGS. 15 and 16 are diagrams of example apparatuses for wireless communication, in accordance with the present disclosure.

FIG. 15 is a diagram of an example apparatus 1500 for wireless communication. The apparatus 1500 may be a UE (e.g., a UE 120, a UE 120*a*, a UE 120*b*), or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a precoding component 1508, among other examples.

In some aspects, the apparatus 1500 may be configured to perform one or more operations described herein in connection with FIGS. 5A-12. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The precoding component 1508 may precode an SRS transmission using a delay-Doppler precoder. The transmission component 1504 may transmit (e.g., to the apparatus 1506), after precoding the SRS transmission using the delay-Doppler precoder, the SRS transmission in an SRS symbol in a slot.

The precoding component 1508 may precode another SRS transmission using another delay-Doppler precoder.

The transmission component 1504 may transmit (e.g., to the apparatus 1506), after precoding the other SRS transmission using the other delay-Doppler precoder, the other SRS transmission in another SRS symbol in the slot, wherein the SRS symbol and the other SRS symbol are adjacent SRS symbols in the slot.

The transmission component 1504 may transmit (e.g., to the apparatus 1506) an indication of a UE capability associated with the UE.

The reception component 1502 may receive (e.g., from the apparatus 1506), based at least in part on the UE capability, the semi-static configuration or the dynamic configuration.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
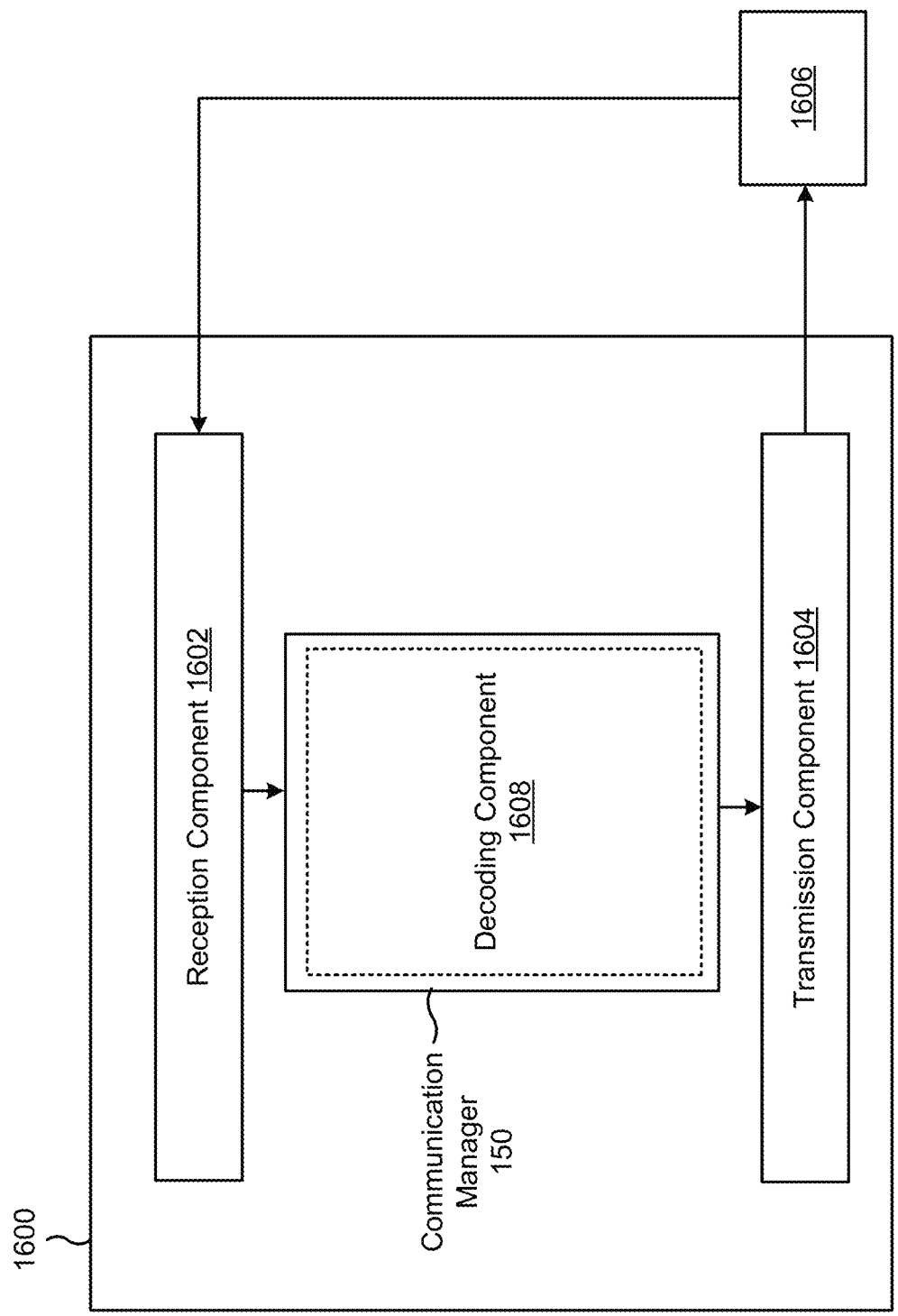

FIG. 16 is a diagram of an example apparatus 1600 for wireless communication. The apparatus 1600 may be a base station (e.g., a base station 110), or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include a decoding component 1608, among other examples.

In some aspects, the apparatus 1600 may be configured to perform one or more operations described herein in connection with FIGS. 5A-12. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the base station described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the base station described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the base station described in connection with FIG. 2. In some aspects, the transmission component 1604 may be co-located with the reception component 1602 in a transceiver.

The reception component 1602 may receive, from an apparatus 1606, an SRS transmission in an SRS symbol in a slot. The decoding component 1608 may decode the SRS transmission using a delay-Doppler decoder.

The reception component 1602 may receive, from another apparatus 1606, another SRS transmission in the SRS symbol in the slot.

The decoding component 1608 may decode the other SRS transmission using another delay-Doppler decoder.

The reception component 1602 may receive, from the apparatus 1606, another SRS transmission in another SRS symbol in the slot, wherein the SRS symbol and the other SRS symbol are adjacent symbols in the slot.

The decoding component 1608 may decode the other SRS transmission using another delay-Doppler decoder.

The reception component 1602 may receive, from another apparatus 1606, another SRS transmission in another SRS symbol in the slot, wherein the SRS symbol and the other SRS symbol are adjacent symbols in the slot.

The decoding component 1608 may decode the other SRS transmission using another delay-Doppler decoder.

The reception component 1602 may receive, from the apparatus 1606, another SRS transmission in the SRS symbol in the slot.

The decoding component 1608 may decode the other SRS transmission using another delay-Doppler decoder, wherein the SRS transmission is associated with a first antenna port of the apparatus 1606, and wherein the other SRS transmission is associated with a second antenna port of the apparatus 1606.

The transmission component 1604 may transmit, to the apparatus 1606, an OTFS precoding configuration, wherein the OTFS precoding configuration comprises a semi-static configuration or a dynamic configuration.

The reception component 1602 may receive (e.g., from the apparatus 1606) an indication of a UE capability associated with the apparatus 1606.

The transmission component 1604 may transmit (e.g., to the apparatus 1606), based at least in part on the UE capability, the OTFS precoding configuration.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: precoding a sounding reference signal (SRS) transmission using a delay-Doppler precoder; and transmitting, after precoding the SRS transmission using the delay-Doppler precoder, the SRS transmission in an SRS symbol in a slot.

Aspect 2: The method of Aspect 1, wherein precoding the SRS transmission using the delay-Doppler precoder comprises: precoding the SRS transmission in a first subset of delay resources for the SRS symbol, wherein the first subset of delay resources are orthogonal to a second subset of the delay resources for the SRS symbol.

Aspect 3: The method of Aspect 2, wherein the delay resources are included in a first Doppler column of a delay-Doppler matrix; and wherein precoding the SRS transmission using the delay-Doppler precoder comprises: precoding the SRS transmission using 0-values for additional delay resources in one or more second Doppler columns of the delay-Doppler matrix for the SRS symbol.

Aspect 4: The method of one or more of Aspects 1-3, wherein precoding the SRS transmission using the delay-Doppler precoder comprises: precoding the SRS transmission in a plurality of delay resources, for the SRS symbol, in which the SRS transmission is code division multiplexed with another SRS transmission.

Aspect 5: The method of Aspect 4, wherein the plurality of delay resources are included in a first Doppler column of a delay-Doppler matrix; and wherein precoding the SRS transmission using the delay-Doppler precoder comprises: precoding the SRS transmission using 0-values for additional delay resources in one or more second Doppler columns of the delay-Doppler matrix for the SRS symbol.

Aspect 6: The method of Aspect 4 or 5, wherein precoding the SRS transmission using the delay-Doppler precoder comprises: using a sequence to apply a cyclic shift to the SRS transmission in the plurality of delay resources, wherein the sequence comprises at least one of: a Zadoff-Chu sequence, or a pseudorandom noise sequence.

Aspect 7: The method of Aspect 6, wherein the cyclic shift is greater than a maximum delay for a channel on which the SRS transmission is to be transmitted.

Aspect 8: The method of one or more of Aspects 1-7, further comprising: precoding another SRS transmission using another delay-Doppler precoder; and transmitting, after precoding the other SRS transmission using the other delay-Doppler precoder, the other SRS transmission in another SRS symbol in the slot, wherein the SRS symbol and the other SRS symbol are adjacent SRS symbols in the slot.

Aspect 9: The method of Aspect 8, wherein precoding the other SRS transmission using the other delay-Doppler precoder comprises: precoding the other SRS transmission in a first subset of delay resources for the other SRS symbol, wherein the first subset of delay resources are orthogonal to a second subset of the delay resources for the other SRS symbol.

Aspect 10: The method of Aspect 8 or 9, wherein precoding the other SRS transmission using the other delay-Doppler precoder comprises: precoding the other SRS transmission in a plurality of delay resources, for the other SRS symbol, in which the other SRS transmission is code division multiplexed in the plurality of delay resources.

Aspect 11: The method of one or more of Aspects 1-10, wherein transmitting the SRS transmission comprises: transmitting the SRS transmission in the SRS symbol using a first antenna port; and wherein the method further comprises: precoding another SRS transmission using another delay-Doppler precoder; and transmitting, after precoding the other SRS transmission using the other delay-Doppler precoder, the other SRS transmission in another SRS symbol in the slot using a second antenna port, wherein the SRS symbol and the other SRS symbol are adjacent SRS symbols in the slot.

Aspect 12: The method of one or more of Aspects 1-11, wherein precoding the other SRS transmission using the other delay-Doppler precoder comprises: precoding the other SRS transmission based at least in part on a semi-static configuration or a dynamic configuration.

Aspect 13: The method of Aspect 12, further comprising: transmitting an indication of a UE capability associated with the UE; and receiving, based at least in part on the UE capability, the semi-static configuration or the dynamic configuration.

Aspect 14: The method of Aspect 12 or 13, wherein the semi-static configuration or the dynamic configuration indicates at least one of: a delay resource usage technique for precoding the SRS transmission, or a delay resource allocation for the SRS transmission.

Aspect 15: The method of one or more of Aspects 1-14, wherein the delay-Doppler precoder comprises an inverse symplectic finite Fourier transform (ISFFT) precoder.

Aspect 16: A method of wireless communication performed by a base station, comprising: receiving, from a user equipment (UE), a sounding reference signal (SRS) transmission in an SRS symbol in a slot; and decoding the SRS transmission using a delay-Doppler decoder.

Aspect 17: The method of Aspect 16, further comprising: receiving, from another UE, another SRS transmission in the SRS symbol in the slot; and decoding the other SRS transmission using another delay-Doppler decoder.

Aspect 18: The method of Aspect 17, wherein decoding the SRS transmission using the delay-Doppler decoder comprises: decoding the SRS transmission into a first subset of delay resources for the SRS symbol; and wherein decoding the other SRS transmission using the other delay-Doppler decoder comprises: decoding the other SRS transmission into a second subset of delay resources for the SRS symbol, wherein the first subset of delay resources and the second subset of delay resources are orthogonal in a first Doppler column for the SRS symbol.

Aspect 19: The method of Aspect 17 or 18, wherein decoding the SRS transmission using the delay-Doppler decoder comprises: decoding the SRS transmission into a plurality of delay resources for the SRS symbol; and wherein decoding the other SRS transmission using the other delay-Doppler decoder comprises: decoding the other SRS transmission into the plurality of delay resources for the SRS symbol, wherein the SRS transmission is cyclic shifted relative to the other SRS transmission.

Aspect 20: The method of one or more of Aspects 16-19, further comprising: receiving, from the UE, another SRS transmission in another SRS symbol in the slot, wherein the SRS symbol and the other SRS symbol are adjacent symbols in the slot; and decoding the other SRS transmission using another delay-Doppler decoder.

Aspect 21: The method of one or more of Aspects 16-20, further comprising: receiving, from another UE, another SRS transmission in another SRS symbol in the slot, wherein the SRS symbol and the other SRS symbol are adjacent symbols in the slot; and decoding the other SRS transmission using another delay-Doppler decoder.

Aspect 22: The method of one or more of Aspects 16-21, further comprising: receiving, from the UE, another SRS transmission in the SRS symbol in the slot; and decoding the other SRS transmission using another delay-Doppler decoder, wherein the SRS transmission is associated with a first antenna port of the UE, and wherein the other SRS transmission is associated with a second antenna port of the UE.

Aspect 23: The method of Aspect 22, wherein decoding the SRS transmission using the delay-Doppler decoder comprises: decoding the SRS transmission into a first subset of delay resources for the SRS symbol; and wherein decoding the other SRS transmission using the other delay-Doppler decoder comprises: decoding the other SRS transmission into a second subset of delay resources for the SRS symbol, wherein the first subset of delay resources and the second subset of delay resources are orthogonal in a first Doppler column for the SRS symbol.

Aspect 24: The method of Aspect 22 or 23, wherein decoding the SRS transmission using the delay-Doppler decoder comprises: decoding the SRS transmission into a plurality of delay resources for the SRS symbol; and wherein decoding the other SRS transmission using the other delay-Doppler decoder comprises: decoding the other SRS transmission into the plurality of delay resources for the SRS symbol, wherein the SRS transmission is cyclic shifted relative to the other SRS transmission.

Aspect 25: The method of one or more of Aspects 16-24, further comprising: transmitting, to the UE, an orthogonal time frequency space (OTFS) precoding configuration, wherein the OTFS precoding configuration comprises a semi-static configuration or a dynamic configuration.

Aspect 26: The method of Aspect 25, further comprising: receiving an indication of a UE capability associated with the UE; and transmitting, based at least in part on the UE capability, the OTFS precoding configuration.

Aspect 27: The method of Aspect 25 or 26, wherein the OTFS precoding configuration indicates at least one of: a delay resource usage technique for precoding the SRS transmission, or a delay resource allocation for the SRS transmission, wherein the delay resource allocation is based at least in part on at least one of: a channel delay spread, or a quantity of resource elements allocated for the SRS symbol.

Aspect 28: The method of one or more of Aspects 16-27, wherein the delay-Doppler decoder comprises a symplectic finite Fourier transform (SFFT) decoder.

Aspect 29: An apparatus for wireless communication at a device, comprising a processor; memory coupled with the processor; and instructions stored in the memory and executable by the processor to cause the apparatus to perform the method of one or more of Aspects 1-15.

Aspect 30: A device for wireless communication, comprising a memory and one or more processors coupled to the memory, the one or more processors configured to perform the method of one or more of Aspects 1-15.

Aspect 31: An apparatus for wireless communication, comprising at least one means for performing the method of one or more of Aspects 1-15.

Aspect 32: A non-transitory computer-readable medium storing code for wireless communication, the code comprising instructions executable by a processor to perform the method of one or more of Aspects 1-15.

Aspect 33: A non-transitory computer-readable medium storing a set of instructions for wireless communication, the set of instructions comprising one or more instructions that, when executed by one or more processors of a device, cause the device to perform the method of one or more of Aspects 1-15.

Aspect 34: An apparatus for wireless communication at a device, comprising a processor; memory coupled with the processor; and instructions stored in the memory and executable by the processor to cause the apparatus to perform the method of one or more of Aspects 16-28.

Aspect 35: A device for wireless communication, comprising a memory and one or more processors coupled to the memory, the one or more processors configured to perform the method of one or more of Aspects 16-28.

Aspect 36: An apparatus for wireless communication, comprising at least one means for performing the method of one or more of Aspects 16-28.

Aspect 37: A non-transitory computer-readable medium storing code for wireless communication, the code comprising instructions executable by a processor to perform the method of one or more of Aspects 16-28.

Aspect 38: A non-transitory computer-readable medium storing a set of instructions for wireless communication, the set of instructions comprising one or more instructions that, when executed by one or more processors of a device, cause the device to perform the method of one or more of Aspects 16-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   precoding a sounding reference signal (SRS) transmission using a delay-Doppler precoder; and
   transmitting, after precoding the SRS transmission using the delay-Doppler precoder, the SRS transmission in an SRS symbol in a slot,
   wherein precoding the SRS transmission using the delay-Doppler precoder comprises precoding the SRS transmission in a first subset of delay resources for the SRS symbol, and
   wherein the first subset of delay resources are orthogonal to a second subset of the delay resources for the SRS symbol.

2. The method of claim 1, wherein the delay resources are included in a first Doppler column of a delay-Doppler matrix; and
   wherein precoding the SRS transmission using the delay-Doppler precoder comprises:
      precoding the SRS transmission using 0-values for additional delay resources in one or more second Doppler columns of the delay-Doppler matrix for the SRS symbol.

3. A method of wireless communication performed by a user equipment (UE), comprising:
   precoding a sounding reference signal (SRS) transmission using a delay-Doppler precoder; and
   transmitting, after precoding the SRS transmission using the delay-Doppler precoder, the SRS transmission in an SRS symbol in a slot,
   wherein precoding the SRS transmission using the delay-Doppler precoder comprises precoding the SRS transmission in a plurality of delay resources, for the SRS symbol, in which the SRS transmission is code division multiplexed with another SRS transmission.

4. The method of claim 3, wherein the plurality of delay resources are included in a first Doppler column of a delay-Doppler matrix; and
   wherein precoding the SRS transmission using the delay-Doppler precoder comprises:
      precoding the SRS transmission using 0-values for additional delay resources in one or more second Doppler columns of the delay-Doppler matrix for the SRS symbol.

5. The method of claim 3, wherein precoding the SRS transmission using the delay-Doppler precoder comprises:
   using a sequence to apply a cyclic shift to the SRS transmission in the plurality of delay resources,
      wherein the sequence comprises at least one of:
         a Zadoff-Chu sequence, or
         a pseudorandom noise sequence.

6. The method of claim 5, wherein the cyclic shift is greater than a maximum delay for a channel on which the SRS transmission is to be transmitted.

7. A method of wireless communication performed by a base station, comprising:
   receiving, from a user equipment (UE), a sounding reference signal (SRS) transmission in an SRS symbol in a slot;
   decoding the SRS transmission using a delay-Doppler decoder;
   receiving, from another UE, another SRS transmission in the SRS symbol in the slot and
   decoding the other SRS transmission using another delay-Doppler decoder,
   wherein decoding the SRS transmission using the delay-Doppler decoder comprises decoding the SRS transmission into a first subset of delay resources for the SRS symbol,
   wherein decoding the other SRS transmission using the other delay-Doppler decoder comprises decoding the other SRS transmission into a second subset of delay resources for the SRS symbol, and
   wherein the first subset of delay resources and the second subset of delay resources are orthogonal in a first Doppler column for the SRS symbol.

8. A method of wireless communication performed by a base station, comprising:
   receiving, from a user equipment (UE), a sounding reference signal (SRS) transmission in an SRS symbol in a slot
   decoding the SRS transmission using a delay-Doppler decoder;
   receiving, from another UE, another SRS transmission in the SRS symbol in the slot and
   decoding the other SRS transmission using another delay-Doppler decoder, wherein decoding the SRS transmission using the delay-Doppler decoder comprises:
      decoding the SRS transmission into a plurality of delay resources for the SRS symbol; and
   wherein decoding the other SRS transmission using the other delay-Doppler decoder comprises:
      decoding the other SRS transmission into the plurality of delay resources for the SRS symbol, wherein the SRS transmission is cyclic shifted relative to the other SRS transmission.

9. A method of wireless communication performed by a base station, comprising:
   receiving, from a user equipment (UE), a sounding reference signal (SRS) transmission in an SRS symbol in a slot
   decoding the SRS transmission using a delay-Doppler decoder;
   receiving, from the UE or from another UE, another SRS transmission in another SRS symbol in the slot, wherein the SRS symbol and the other SRS symbol are adjacent symbols in the slot; and
   decoding the other SRS transmission using another delay-Doppler decoder.

10. A method of wireless communication performed by a base station, comprising:
    receiving, from a user equipment (UE), a sounding reference signal (SRS) transmission in an SRS symbol in a slot and
    decoding the SRS transmission using a delay-Doppler decoder, wherein the delay-Doppler decoder comprises a symplectic finite Fourier transform (SFFT) decoder.

11. A user equipment (UE) for wireless communication, comprising:
- a memory; and
- one or more processors, coupled to the memory, configured to:
  - precode a sounding reference signal (SRS) transmission using a delay-Doppler precoder;
  - transmit, after precoding the SRS transmission using the delay-Doppler precoder, the SRS transmission in an SRS symbol in a slot;
  - precode another SRS transmission using another delay-Doppler precoder; and
  - transmit, after precoding the other SRS transmission using the other delay-Doppler precoder, the other SRS transmission in another SRS symbol in the slot,
  - wherein the SRS symbol and the other SRS symbol are adjacent SRS symbols in the slot.

12. The UE of claim 11, wherein the one or more processors, to precode the other SRS transmission using the other delay-Doppler precoder, are configured to:
- precode the other SRS transmission in a first subset of delay resources for the other SRS symbol,
  - wherein the first subset of delay resources are orthogonal to a second subset of the delay resources for the other SRS symbol.

13. The UE of claim 11, wherein the one or more processors, to precode the other SRS transmission using the other delay-Doppler precoder, are configured to:
- precode the other SRS transmission in a plurality of delay resources, for the other SRS symbol, in which the other SRS transmission is code division multiplexed in the plurality of delay resources.

14. The UE of claim 11, wherein the delay-Doppler precoder comprises an inverse symplectic finite Fourier transform (ISFFT) precoder.

15. A user equipment (UE) for wireless communication, comprising:
- a memory; and
- one or more processors, coupled to the memory, configured to:
  - precode a sounding reference signal (SRS) transmission using a delay-Doppler precoder; and
  - transmit, after precoding the SRS transmission using the delay-Doppler precoder, the SRS transmission in an SRS symbol in a slot using a first antenna port;
  - precode another SRS transmission using another delay-Doppler precoder; and
  - transmit, after precoding the other SRS transmission using the other delay-Doppler precoder, the other SRS transmission in another SRS symbol in the slot using a second antenna port,
  - wherein the SRS symbol and the other SRS symbol are adjacent SRS symbols in the slot.

16. The UE of claim 15, wherein the one or more processors, to precode the other SRS transmission using the other delay-Doppler precoder, are configured to:
- precode the other SRS transmission based at least in part on a semi-static configuration or a dynamic configuration.

17. The UE of claim 16, wherein the one or more processors are further configured to:
- transmit an indication of a UE capability associated with the UE; and
- receive, based at least in part on the UE capability, the semi-static configuration or the dynamic configuration.

18. The UE of claim 16, wherein the semi-static configuration or the dynamic configuration indicates at least one of:
- a delay resource usage technique for precoding the SRS transmission, or
- a delay resource allocation for the SRS transmission.

19. A base station for wireless communication, comprising:
- a memory; and
- one or more processors, coupled to the memory, configured to:
  - receive, from a user equipment (UE), a sounding reference signal (SRS) transmission in an SRS symbol in a slot;
  - decode the SRS transmission using a delay-Doppler decoder;
  - receive, from the UE, another SRS transmission in the SRS symbol in the slot; and
  - decode the other SRS transmission using another delay-Doppler decoder, wherein the SRS transmission is associated with a first antenna port of the UE, and wherein the other SRS transmission is associated with a second antenna port of the UE.

20. The base station of claim 19, wherein the one or more processors, to decode the SRS transmission using the delay-Doppler decoder, are configured to:
- decode the SRS transmission into a first subset of delay resources for the SRS symbol; and
- wherein the one or more processors, to decode the other SRS transmission using the other delay-Doppler decoder, are configured to:
  - decode the other SRS transmission into a second subset of delay resources for the SRS symbol,
  - wherein the first subset of delay resources and the second subset of delay resources are orthogonal in a first Doppler column for the SRS symbol.

21. The base station of claim 19, wherein the one or more processors, to decode the SRS transmission using the delay-Doppler decoder, are configured to:
- decode the SRS transmission into a plurality of delay resources for the SRS symbol; and
- wherein the one or more processors, to decode the other SRS transmission using the other delay-Doppler decoder, are configured to:
  - decode the other SRS transmission into the plurality of delay resources for the SRS symbol,
  - wherein the SRS transmission is cyclic shifted relative to the other SRS transmission.

22. A base station for wireless communication, comprising:
- a memory; and
- one or more processors, coupled to the memory, configured to:
  - transmit, to the UE, an orthogonal time frequency space (OTFS) precoding configuration, wherein the OTFS precoding configuration comprises a semi-static configuration or a dynamic configuration
  - receive, from a user equipment (UE), a sounding reference signal (SRS) transmission in an SRS symbol in a slot and
  - decode the SRS transmission using a delay-Doppler decoder,
  - wherein the OTFS precoding configuration indicates at least one of:
    - a delay resource usage technique for precoding the SRS transmission, or
    - a delay resource allocation for the SRS transmission, and wherein the delay resource allocation is based at least in part on at least one of:
a channel delay spread, or
a quantity of resource elements allocated for the SRS symbol.

23. The base station of claim 22, wherein the one or more processors are further configured to:
receive an indication of a UE capability associated with the UE; and
transmit, based at least in part on the UE capability, the OTFS precoding configuration.

\* \* \* \* \*